DATA BOUNDARY CROSS-OVER AND/OR ADVANCE DATA ACCESS SYSTEM

Filed Jan. 15, 1959 12 Sheets-Sheet 1

INVENTOR.
WILLIAM WOLENSKY
BY Darby & Darby
ATTORNEYS

DATA BOUNDARY CROSS-OVER AND/OR ADVANCE DATA ACCESS SYSTEM

Filed Jan. 15, 1959

12 Sheets-Sheet 2

INVENTOR.
WILLIAM WOLENSKY
BY Darby & Darby
ATTORNEYS

INVENTOR.
WILLIAM WOLENSKY
BY Darby & Darby
ATTORNEYS

DATA BOUNDARY CROSS-OVER AND/OR ADVANCE DATA ACCESS SYSTEM

Filed Jan. 15, 1959 12 Sheets-Sheet 4

INVENTOR.
WILLIAM WOLENSKY
BY Darby & Darby
ATTORNEYS

INVENTOR.
WILLIAM WOLENSKY
BY Darby & Darby
ATTORNEYS

DATA BOUNDARY CROSS-OVER AND/OR ADVANCE DATA ACCESS SYSTEM

Filed Jan. 15, 1959 12 Sheets-Sheet 6

INVENTOR.
WILLIAM WOLENSKY
BY Darby & Darby
ATTORNEYS

DATA BOUNDARY CROSS-OVER AND/OR ADVANCE DATA ACCESS SYSTEM

Filed Jan. 15, 1959 12 Sheets-Sheet 7

BYTE MASKING DECODER 250

INVENTOR.
WILLIAM WOLENSKY
BY Darby & Darby
ATTORNEYS

INVENTOR.
WILLIAM WOLENSKY
BY Darby & Darby
ATTORNEYS

DATA BOUNDARY CROSS-OVER AND/OR ADVANCE DATA ACCESS SYSTEM

Filed Jan. 15, 1959 12 Sheets-Sheet 9

INVENTOR.
WILLIAM WOLENSKY
BY Darby & Darby
ATTORNEYS

INVENTOR.
WILLIAM WOLENSKY
BY Darby & Darby
ATTORNEYS

FIG. 10.

| | ORIGINAL CONDITIONS | 1st CYCLE | 2nd CYCLE | 3rd CYCLE | 4th CYCLE | 5th CYCLE |
|---|---|---|---|---|---|---|
| Y TIME (ADJUST FIELD LENGTH) | 38 BITS | 30 BITS | 22 BITS | 14 BITS | 6 BITS | -2 BITS (OVERDRAW) |
| BYTE SIZE AT END OF Y TIME | 8 BITS | 8 BITS | 8 BITS | 8 BITS | 8 BITS | 6 BITS |
| X TIME (EXTRACT BYTE) | NONE EXTRACTED | 1st BYTE EXTRACTED (BITS 29-36 OF WORD 129) | 2nd BYTE EXTRACTED (BITS 37-44 OF WORD 129) | 3rd BYTE EXTRACTED (BITS 45-52 OF WORD 129) | 4th BYTE EXTRACTED (BITS 53-60 OF WORD 129) | 5th BYTE EXTRACTED (BITS 61-63 OF WORD 129 AND BITS 0-2 OF WORD 130) |
| BITS MASKED | | 0 | 0 | 0 | 0 | 2 |
| Z TIME (ADJUST BIT ADDRESS) | BIT 29 | BIT 37 | BIT 45 | BIT 53 | BIT 61 | OPERATION COMPLETE |

FIG. 8.

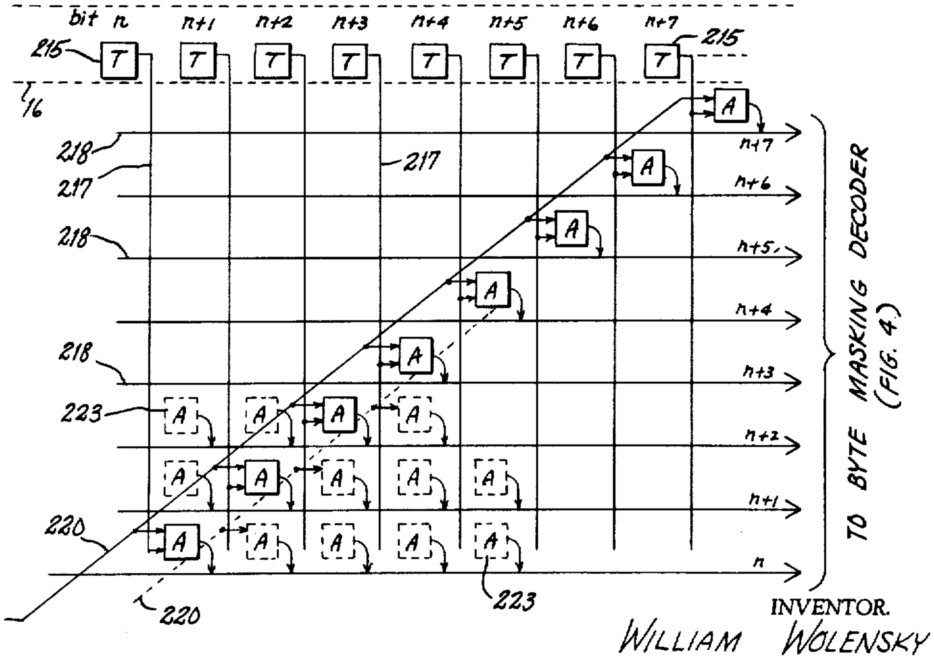

INVENTOR.
WILLIAM WOLENSKY
BY Darby & Darby
ATTORNEYS

INVENTOR.
WILLIAM WOLENSKY
BY Darby & Darby
ATTORNEYS 3,109,162

DATA BOUNDARY CROSS-OVER AND/OR ADVANCE DATA ACCESS SYSTEM

William Wolensky, Poughkeepsie, N.Y., assignor to International Business Machines Corporation, New York, N.Y., a corporation of New York Filed Jan. 15, 1959, Ser. No. 786,947
13 Claims. (Cl. 340—172.5)

This invention relates to data handling systems and more particularly to a control system for use in conjunction with a digital computer storage register which permits data to be extracted from one part of the register while additional data is being inserted into another part of the same register.

In certain operations performed with digital computers data is extracted from a computer memory which stores a large number of Memory Words. Each of the Memory Words is formed by a predetermined number of basic units of digital information called a Bit. The amount of data extracted from the memory for any one operation is called a Data Word and each Data Word contains an arbitrary number of Bits of information in accordance with the amount of information desired to be extracted from the memory for the particular operation. The Data Word to be extracted from the computer memory may be any part of a Memory Word, any number of Memory Words, or combinations of parts and number of Memory Words. The Data Word may begin and end at any Bit position of any Memory Word.

A Data Word may be extracted from the computer memory by means of a Storage Register which is located intermediate to the computer memory and the utilization device to which the Data Word is to be transferred. The Storage Register is connected to the computer memory and is constructed of a size sufficient to store the Bits of a single Memory Word which are transferred to the Register from the computer memory. The transfer of the data from the Storage Register to the utilization device is accomplished in usually fixed size increments of Bits called Bytes of information. In the usual case, the size of the Memory Word, which is the storage capacity of the Storage Register, is equal to a plurality of Bytes.

Since the size and starting location of the Data Word is arbitrarily chosen, for any given operation in which the data is being transferred in Byte sized segments forming the Data Word, three conditions may exist. These conditions are as follows: (1) the Data Word may lie completely within the one Word which is stored in the Storage Register, (2) the Data Word may exceed the capacity of the Word stored in the Register and lie within many Memory Words, and (3) the Data Word may be equal to or less than the Word size but because it may begin at any Bit position of the Word it may lie within two Memory Words.

A major object in any data handling system is to maximize the number of operations which the system can perform in a given period of time, thereby increasing the system's productive work capacity. In order to achieve the goal of making the system as productive as possible, it is therefore desirable to utilize the Storage Register to its maximum capacity by eliminating the nonproductive time interval during which Memory Words are transferred to it from the computer memory. The time during which a Memory Word is transferred from the computer memory to the Storage Register is actually wasted since no operations can be performed by the computer during this interval. In Case 1 presented above, this factor is of no importance since the Data Word selected lies only within the single Word stored in the Storage Register. However, in Cases 2 and 3, where the Data Word lies within a plurality of Memory Words, the transfer time from the computer memory to the Storage Register becomes an important consideration if the maximization of the data handling capacity of the computer is to be realized.

The present invention is primarily concerned with maximizing the operating efficiency of a data handling system of eliminating the "dead time" which ocurs during the transfer of a Memory Word from the computer memory to the Storage Register. This is accomplished by providing circuits which permit a memory access to the computer memory in such a manner so that one-half of the Storage Register is loaded with data designated for future extraction while data is being extracted from the other half of the Register in Byte size segments. In this invention, the mid-point and end of the Storage Register are each designated as a Boundary and the utilization of one-half of the Register for data transfer while the other half is being loaded with data is accomplished by logical circuits which determine whether the desired Data Word crosses over a Boundary and extends into the other half of the Register. If it does, data access operation is initiated to load the proper half of the Storage Register at the proper time with half of a new Memory Word so that the information may be extracted in a continuous stream of Bytes without incurring any time delay for loading the Register. The present invention also provides an advance data access feature whereby if the starting Bit of the first Byte to be extracted lies closer to a Boundary of the Register than the number of Bits in a Byte, then the other half of the Register, is loaded with the next Memory Word before the first Byte is extracted from the preceding Memory Word. A Byte masking decoder is also provided which masks out the unwanted Bits of a Byte when the data extracted from the Register is less than a full Byte.

It is, therefore, an object of this invention to provide a data cross-over and/or advance data access system.

It is another object of this invention to provide a data handling system in which a portion of the Storage Register is being loaded with data while data is being extracted from another portion of the Register.

A further object of the invention is to provide a data handling system which eliminates the time interval required for loading successive Memory Words into a Storage Register by loading half of the Register with data while data extraction is taking place in the other half of the Register.

Yet another object of this invention is to provide a system for advance data access in which provision is made for insuring that a Storage Register is loaded with the data for extraction before an attempt is allowed to be made to extract said data.

Still a further object of this invention is to provide a device for masking an undesired portion of a segment of extracted data.

Other objects of the invention will be pointed out in the following description and claims and illustrated in the accompanying drawings, which disclose, by way of examples, the principle of the invention and the best mode, which has been contemplated, of applying that principle.

In the drawings:

FIG. 1 is an illustration of certain of the principles of the present invention;

FIGS. 2A and 2B taken together are diagrammatic representations of the data boundary cross-over and/or advance data access system;

FIG. 8 is a schematic representation of a continuous stream register;

FIG. 10 is a table illustrating the operation of the system as applied to a specific example.

In accordance with the objects of the invention it is desired to transfer a Data Word of any size from the memory of a data handling system to a utilization device by means of an intermediate Storage Register. In order to properly identify the Data Word which is to be transferred, four quantities must be initially determined. These four quantities are listed and defined as follows: (1) Memory Word Address—this locates that Data Word to be extracted as beginning within one of the Memory Words which is stored in the computer memory. This address changes when an end Boundary of the Register is crossed; (2) Byte size—this is the Bit segment size in which the Data Word is to be extracted from the Register. The Byte size is normally held constant; (3) Bit Address—this locates the starting Bit position of the Byte of the Data Word being extracted at a particular time within the designated Memory Word. The Bit Address changes with each successive extraction of a Byte of information; and (4) Field Length—this is the number of Bits of information of the Data Word yet to be extracted and is a variable quantity which decreases as each successive Byte is extracted.

Figure 1:
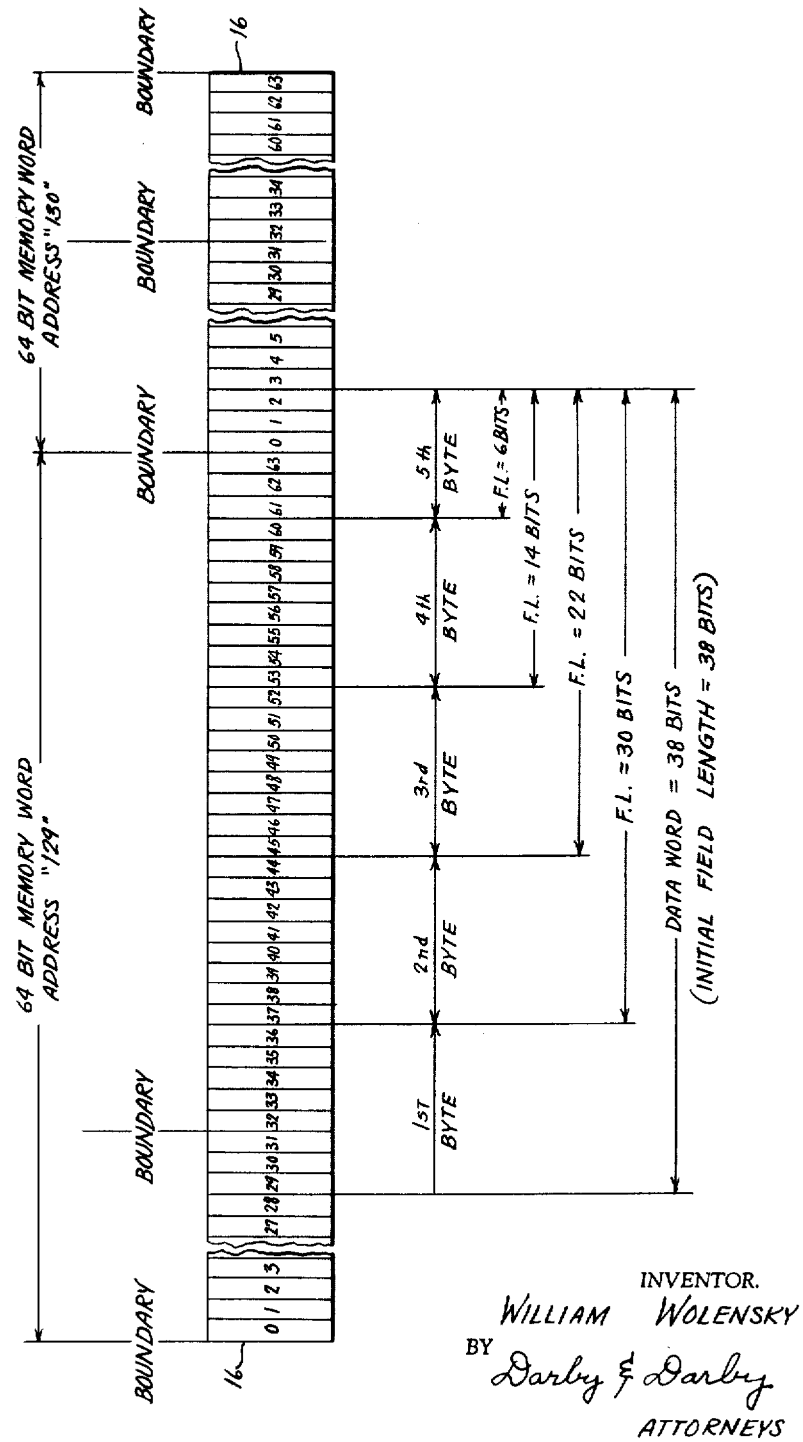

These quantities are explained by referring to FIG. 1, which by way of illustration shows a Data Word of 38 Bits (initial Field Length) which is to be extracted from the computer memory in Byte size segments of 8 Bits beginning at Bit position 29 of a 64 Bit Memory Word 129. While in the example described, the size of the Memory Word is 64 Bits and the size of a Byte is 8 Bits, it should be realized that other Byte and Memory Word sizes may be used.

In FIG. 1, it is assumed that Bits 0–63 of Memory Word 129 are initially stored in a Storage Register 16. The Boundaries of the Storage Register divide the Register into two equal parts and are shown as located in front of Bit 0 (after Bit 63) and between Bits 31 and 32. When the first eight Bit Byte of data, beginning at Bit position 29, is extracted from the Register, the Boundary between Bits 31 and 32 is crossed. After this first Byte is extracted, it should be noticed that the data of the left half of Memory Word 129 in the Register is no longer needed and it can be replaced by the left half of Memory Word 130, which is stored in the computer memory. The crossing of the Boundary between Bits 31 and 32 initiates an operation which replaced the left half of Memory Word 129 with the left half of Memory Word 130. After the extraction of the first Byte, the Field Length changes to 30 Bits, i.e. the initial Field Length minus the number of Bits in a Byte, and the Bit Address changes from Bit 29 to Bit 37, i.e. the original starting Bit position, plus the number of Bits in a Byte. The second, third and fourth Bytes are taken from the right-hand half of Memory Word 129 to extract Bits 37–60 from the Register. At this time the Field Length is 6 Bits and the Bit Address is Bit 63 of Memory Word 129. The fifth Byte contains the last three Bits of Memory Word 129 and the first three Bits of Memory Word 130. The three Bits of Memory Word 130 were brought into the left half of Register 16 during the time that the second, third and fourth Bytes were being extracted from the right half of the Register and are, therefore, available for instant extraction. When the Boundary between Bit 63 and Bit 0 was crossed during the fifth Byte, the right half of Memory Word 130 could have been read into the right half of the Register. However, since the data extraction operation is completed in the left-hand portion of the Register, the additional information from the right half of Memory Word 130 is not needed. In this manner, the handling capacity of the computer is maximized because one-half of the computer Register is being loaded with information designated for future extraction at the same time that information is being extracted from the other half.

A detailed description of the construction and operation of the system of the present invention is given below. The operation of the system is explained in terms of the illustrative example, discussed with respect to FIG. 1, but it should be realized, however, that this example is not intended to limit the operation of the invention in any manner since the invention may be used to extract Data Words of any number of Bits, in any size Byte, beginning at any Bit position, and working from either left to right or right to left along the Register.

Figure 7:
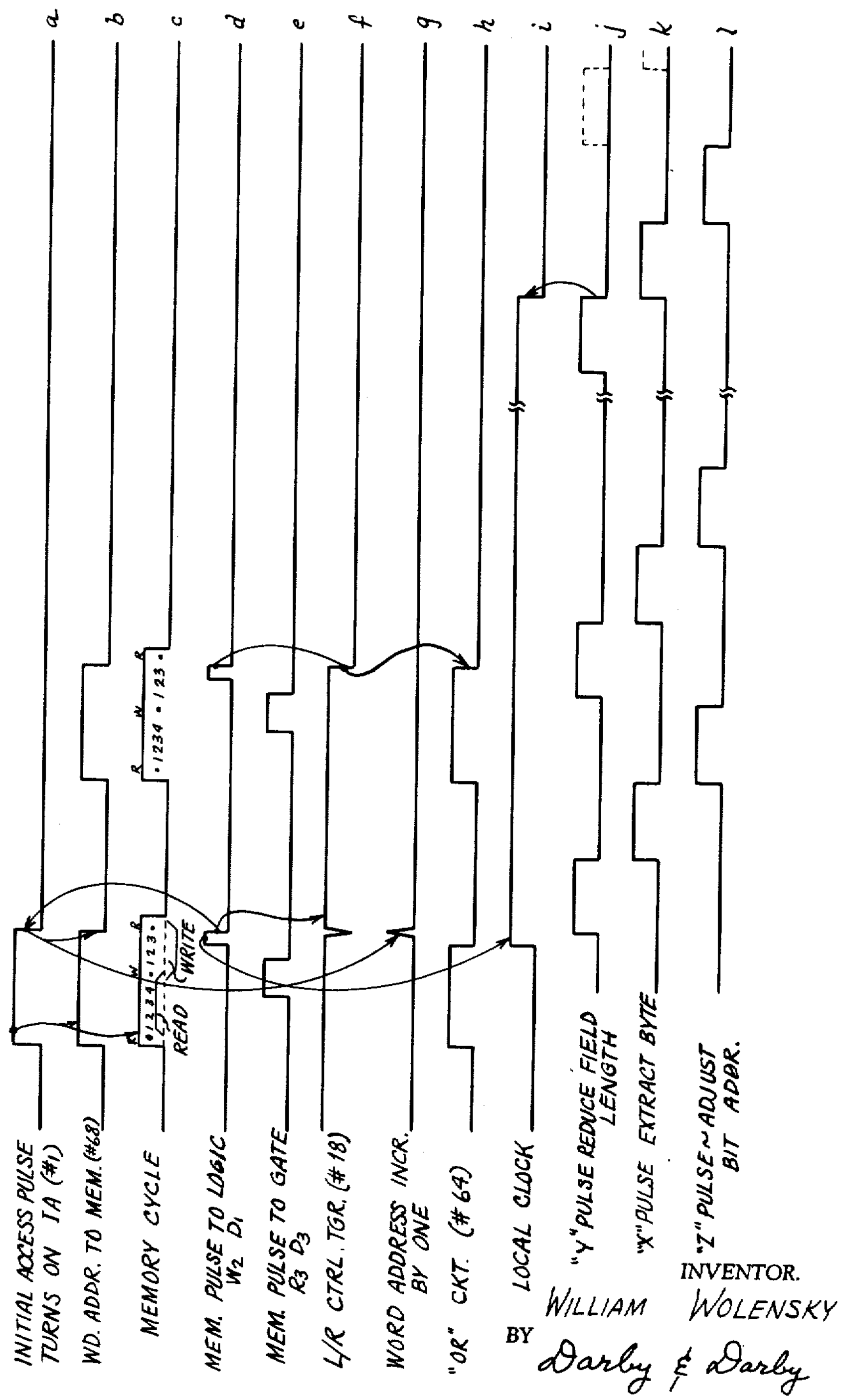
FIG. 7 is a timing chart which represents the operation of the system as applied to the extraction of data.

Referring to FIG. 7, the system operates under the control of externally generated pulses which are supplied to the system at various times and for various durations during the computer memory cycle shown on line *c*. The memory cycle of FIG. 7 line *c* is divided into two portions, a read portion and a write portion. Each of the read and write portions is in turn divided into a number of intervals of equal time duration designated R0 . . . R4, W1 . . . W4, R0. Each interval of the memory cycle is equal in duration to one unit of time D. Thus, an event which is scheduled to happen beginning at R3 of the memory cycle and lasting three units of time would be designated R3D3. Other events happening during the memory cycle are similarly designated.

Figure 2B:
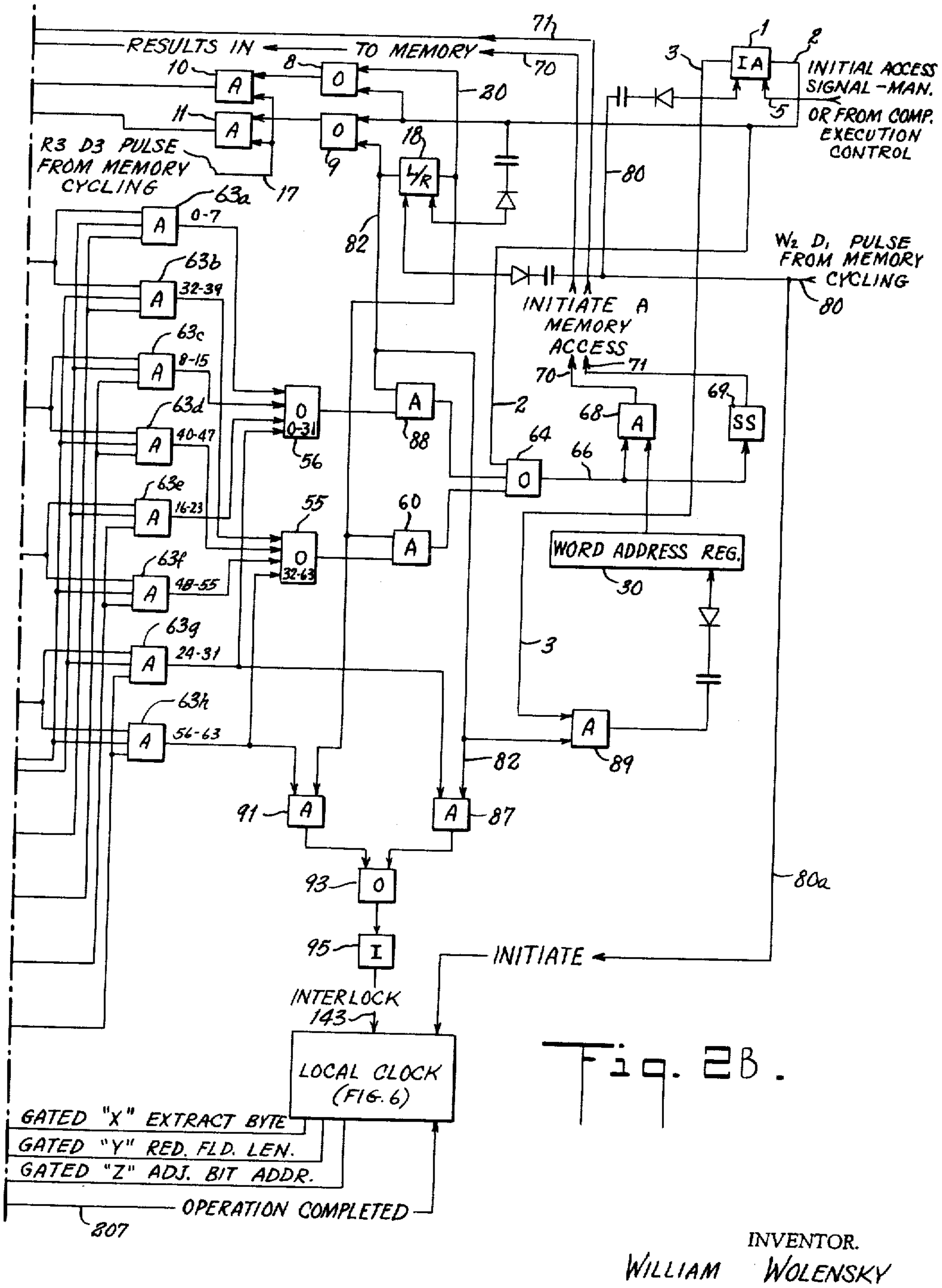
Figure 2A:
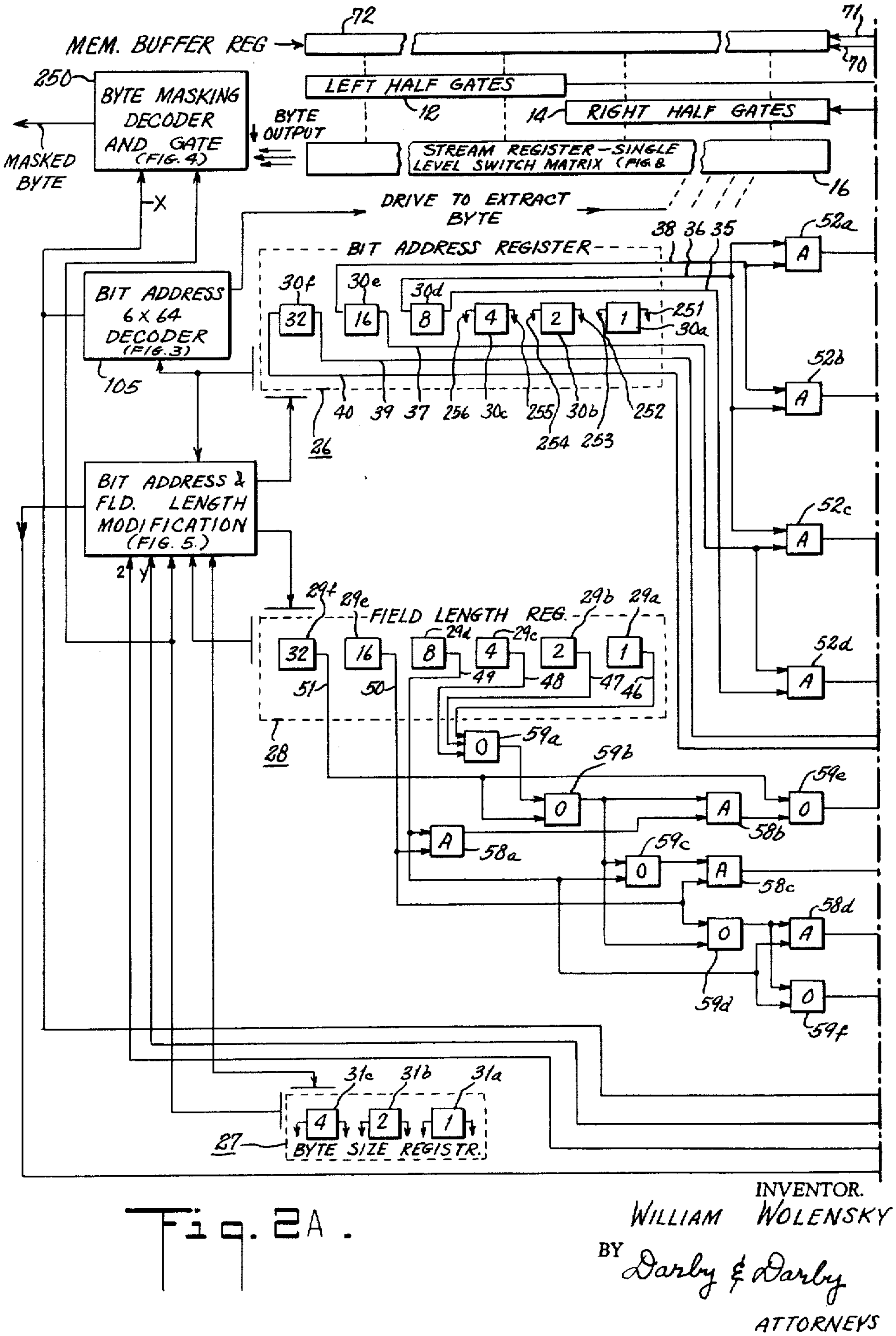

Referring now to FIGS. 2A and 2B, a schematic block diagram which illustrates the overall system is shown. In FIG. 2, and in the other figures, the logical circuitry which is shown and referred to in the specification, for example, inverter circuits, AND circuits, OR circuits, EXCLUSIVE OR circuits, triggers, flip-flops, shift-registers, binary counters, gates, etc., may be formed by any suitable circuit elements. For example, either transistors or vacuum tubes may be used in any of the above listed circuits. In some instances, it might be desirable to use diodes for the AND, OR and EXCLUSIVE OR circuits. Suitable coupling elements may also be provided between circuits such as in the case where it is desired to use a transistor of one conductivity type to feed another transistor of the same conductivity type. The construction of all of these circuits is well within the knowledge of those skilled in the art and no further explanation is deemed necessary.

The initial conditions for the extraction of the desired Data Word are set into a Bit Address Register 26, a Byte Size Register 27, a Field Length Register 28, and a Word Address Register 30. The initial conditions are supplied to each of the registers 26, 27, 28 and 30 in the form of a binary number which is representative of the particular initial condition. For example, the Bit Address Register 26 is supplied with the binary number representative of the number 29 which is representative of the starting Bit position. Each of the other registers 27, 28 and 30 is supplied with the information pertinent to its function.

Each of the registers 26 and 27 is formed by a series of triggers respectively designated as 30 and 31. The triggers 30 and 31 are of the bistable type having two outputs which in response to a binary 1 input produce a signal on one of the output lines while producing no signal on the other. In response to a binary 0 input, the signals appearing on the output lines are reversed. In the convention adopted with respect to this specification, each of the triggers 30 and 31 produces a signal on its right (true) output line in response to a binary 1 set signal and produces a signal on its left (complementary) output line in response to a binary 0 set signal.

The Field Length Register 28 is formed by a series of triggers 29, each of which has only one output. In response to a binary 1 input to a trigger 29, a signal is generated at the output and in response to a binary 0 input, no signal is generated. Each of the triggers 29, 30 and 31 is designated inside its block by the binary digit which it represents, i.e. 1, 2, 4, 8, 16, 32, etc.

There are as many triggers 30, 31 and 29 in the registers 26, 27 and 28 as there are binary digits in the decimal number being represented. The binary numbers are formulated in accordance with standard binary numeric techniques. For example, when the binary number 38, i.e. 100110 is supplied to the Field Length Register 28, triggers 29*b*, 29*c* and 29*f* are switched on thereby producing signals on respective lines 27, 28 and 51. Triggers 29*a*, 29*d* and 29*e* are switched off and no signals are produced on respective lines 46, 49 and 50. Stated another way, lines 47, 48 and 51 are "up" while lines 46, 49 and 50 are "down." In a similar manner, the bistable flip-flop circuits 30 of the Bit Address Register 26 are supplied with information to produce signals to represent the starting Bit position Bit 29. In FIG. 2, only the three higher order Bit triggers 30*d*, 30*e* and 30*f* are shown with output lines connected to the remainder of the circuit. The utilization of the signals of the three lower order Bit triggers 30*a*, 30*b* and 30*c* is described later. In response to the binary number 29, i.e. 011101, lines 35, 37 and 40 are up, i.e. a signal present on them, and lines 36, 38 and 39 are down, i.e. no signal present on them.

The Byte Size Register 27 receives binary information to produce a signal which is representative of a Byte Size of 8 Bits. By special definition this means that each of the triggers 31 in the Byte Size Register 27 produces a signal on its complementary (left) output line. The output sequence for the triggers 31 of the Byte Size Register would be normal for any other number except the number 8.

A binary address is also supplied to the Word Address Register 30 which is representative of the Memory Word 129. The Word Address Register is desirably of the negative shift type and is formed by a number of circuits (not shown) which are connected to operate as a shift register. Shift registers, operating in response to either positive or negative pulses, and running forward or backward, are well known in the art and need no further description here. With these predetermined conditions sent into the information registers of the system, it now stands ready to perform the operation of extracting the desired Data Word.

In order to initiate the operation of the system, an initial access signal is supplied over line 5 from the computer execution control to an initial access trigger 1. This pulse is shown on line *a* of FIG. 7. The initial access pulse turns trigger 1 on and causes line 2 to be up. Line 2 being up causes OR circuit 64 to produce an output on line 66 which is connected to one input of an AND circuit 68. The signal on lines 66 opens AND gate 68 (in reality a plurality of gates) whose other input is connected to the Word Address Register 30, allowing the Memory Word Address 129 to be applied via line 70 (in reality a plurality of lines) to the computer memory. The signal on line 66 also actuates a single shot multi-vibrator 69 to supply a control signal over line 71 to the computer memory. The simultaneous occurrence of the control signal on line 71 and the Memory Word Address on line 70 results in the Memory Word 129 being written into a Buffer Storage Register 72. The Buffer Storage Register 72 may be any suitable device which is capable of storing a Memory Word, for example, a series of triggers or magnetic cores.

The operation of supplying the Memory Word Address to memory and loading that Memory Word into the transfer Register 72 starts at the beginning of the initial access pulse (shown on line *a*, FIG. 7) and lasts until time W3 of the memory cycle. This is shown on line *b* of FIG. 7 and is represented as the period during which AND gate 68 is held open by the signal supplied from the initial access trigger 1. This is the same period during which the initial access trigger 1 is on (line *a* of FIG. 7).

Line 2 being up also conditions a pair of OR circuits 8 and 9 and causes signals to be produced at their outputs. The signals from OR circuits 8 and 9 are applied to the inputs of respective AND circuits 10 and 11. At time R3, as shown at line *e* of FIG. 7, a pulse of duration D3 is supplied over line 17 to the other inputs of AND circuits 10 and 11. Gates 10 and 11 are now conditioned and signals now appear at the outputs of the AND circuits. These signals are applied respectively to the left half gates 12 and the right half gates 14. The gates 12 and 14 may be formed by a number of diodes or transistors having a total equal to the number of Bits in half a Memory Word, e.g. 32. The other inputs to the gates 12 and 14 are from the individual storage element of the Buffer Register 72. When signals are supplied from the AND circuits 10 and 11, the left half and the right half gates 12 and 14 are opened and both halves of Memory Word 129 are placed in a Register 16. In a preferred embodiment of the invention, the Register 16 is of the continuous stream type. The operation of the continuous stream Register 16 is described later and for a complete explanation reference is made to the application of W. Bucholz et al., Serial No. 651,-654 filed April 9, 1957, and assigned to the assignee of this application. Once a Word is stored in the Register 16, the system is ready to commence the operation of extracting data beginning at Bit position 29 of Memory Word 129, which is now stored in the Register 16.

At time W2 of the memory cycle a pulse of duration D1 (shown on line *d* of FIG. 7) is applied over line 80 to logical circuits of the system. The trailing edge of the W2D1 pulse is effective over line 80 to turn off initial access trigger 1, therefore bringing down line 2 and closing the gates 12 and 14. Trigger 1 in going off, brings up line 3 and applies a signal to one input of AND circuit 89, the output of which is connected to the shift line input of the negative shift Word Address Register 30. Line 2 is also connected to one input of a L/R trigger 18 which was initially in a state with its output line 20 up and its output line 82 down. Line 2 in going down results in the L/R trigger 18 being set momentarily so that line 20 is down and line 82 is up. The W2D1 pulse on line 80 immediately switches the condition of L/R trigger 18 producing a negative going spike pulse (shown on line *f* of FIG. 7) on line 20. Since line 82 was initially down, the momentary rise of the signal level on line 82 results in a positive spike pulse being generated at the output of AND circuit 89 (FIG. 7, line 8) which is conveyed to the Word Address Register 30. The trailing edge of the positive spike pulse causes the Memory Word Address to count by 1, now being equal to the Memory Word 130. This new Word Address is not transferred to the Memory Buffer Register 72 since, when line 2 goes down, OR circuit 64 is deconditioned and no output signal appears on line 66 to condition AND circuit 68, or to turn on the single shot multivibrator 69. This is shown at FIG. 7, line *h*, where the first positive pulse on that line signifies that the OR circuit 64 was conditioned so that Memory Word 129 was passed to the Buffer Register 72. As will later be shown, under the initial conditions set forth, there was no signal supplied to OR circuit 64 from the connected AND circuits 60 and 88, so that AND circuit 68 could not be conditioned via these circuits.

Figure 6:
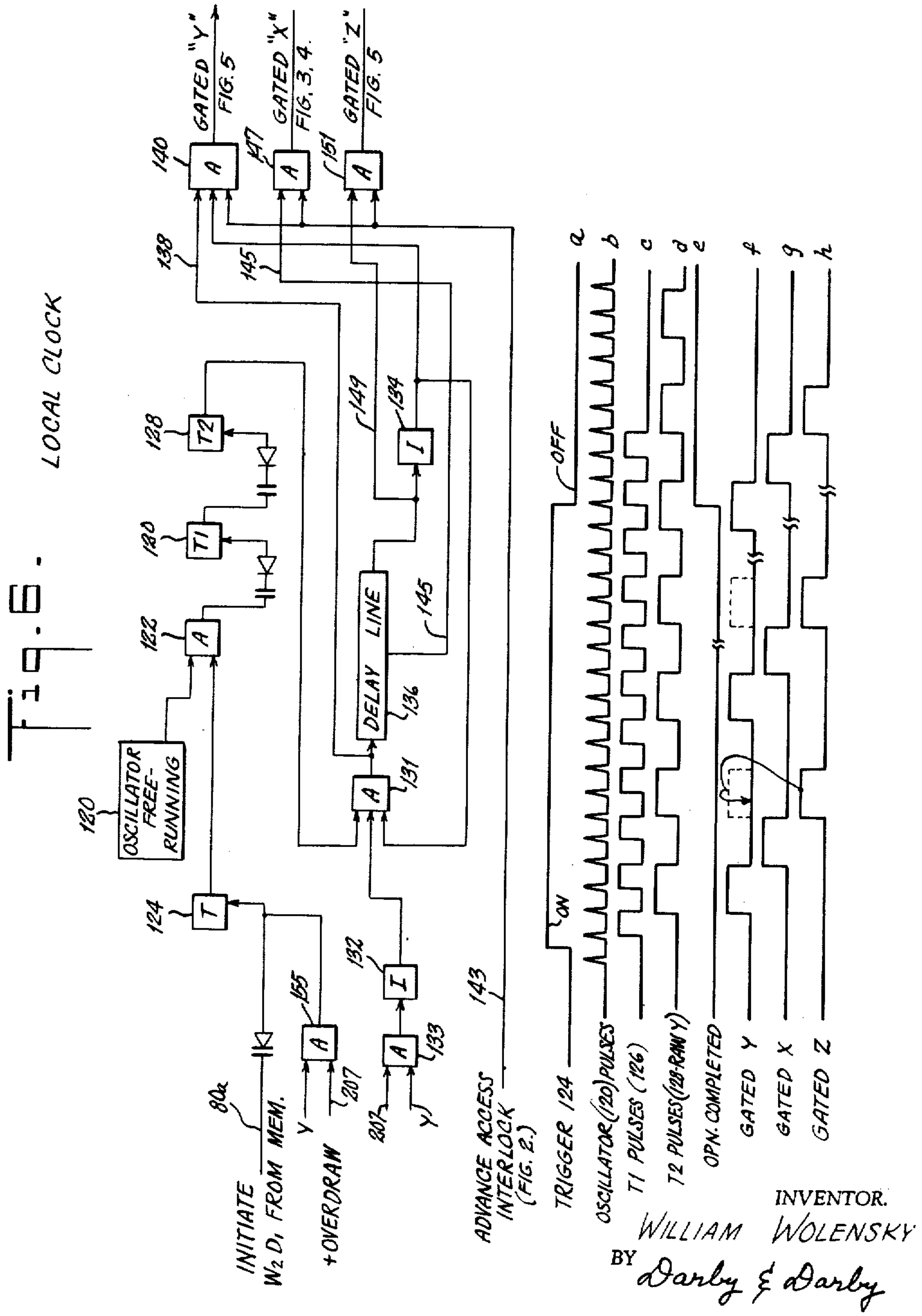
FIG. 6 is a diagram of the timing circuits of the system and the operation thereof.

The first W2D1 pulse from the memory cycling is applied over line 80*a* to initiate the action of the clock circuits which are used to control the extraction operation of the system. These clock circuits are shown in FIG. 6. In general, the clock circuits of FIG. 6 are used to produce three gating pulses of equal time duration at successive intervals of time. Each of the three pulses controls a system function for the interval during which it is produced. The first of these intervals, called the Y interval, is the period during which the Field Length is reduced in accordance with the Byte size by updating the data which is set into the Field Length Register 28. The second interval, called X, immediately follows interval Y, and is the period during which the Byte of information is extracted from the Register 16. The last of the three intervals, called Z, which immediately follows interval X, is used to update the Bit Address supplied to the Bit Address Register 26, i.e. increase the Bit Address by the Byte size.

The local clock circuits of FIG. 6 operate as follows. A free-running oscillator or multi-vibrator 120 has its output connected to one of the inputs of an AND circuit 22. The output of the free-running oscillator 120 is shown on line *b* of FIG. 6. The trailing edge of the W2D1 pulse from the computer execution control is applied over line 80*a* to the input of a trigger 124, which turns the trigger on thereby producing an output pulse (shown at line *a* of FIG. 6) at the other input of AND circuit 122. Since AND circuit 122 is now conditioned, the oscillator pulses from the oscillator 120 pass through the gate and are applied to the input of bistable T1 trigger 126. Each trailing edge of a pulse from oscillator 120 causes the T1 trigger 126 to switch from an on to an off (or from an off to an on) condition and to produce the square wave pulses (shown on line *c* of FIG. 6) on its output line. The output from the T1 trigger 126 is applied to the input of T2 bistable trigger 128. The trailing edge of each of the pulses produced by the T1 trigger 126 causes the T2 trigger 128 to switch, thereby producing the output pulses which are shown on line *d* of FIG. 6. Each of the pulses from the output of the T2 trigger 128 is applied to one of the inputs of a three input AND circuit 131. Another input of the AND circuit 131 is connected through an inverter 132 to the appropriate signal line 203 in the system which signals whether the extraction operation of the Data Word is completed, i.e. when the Field Length is zero Bits or an overdraw condition exists. These conditions will be explained later but for the time being, since the extraction operation is just commencing, there is no signal present on the input to inverter circuit 132 and, therefore, the inverter 132 serves to produce a signal on its output line which is applied to a second input of AND circuit 131. The third input to the AND circuit 131 is from an inverter 134 whose input is connected to the output 149 of a delay line 136.

Delay line 136 is constructed so that its total delay is equal to twice the duration of an applied pulse. The delay line is center tapped so that a pulse delay equal to the period of one of the applied pulses may be obtained. Again, since the operation is just commencing, there is no output from the delay line 136 and, therefore, the inverter circuit 134 producers a signal on its output line which is applied to the third input of AND circuit 131. The three signals being present at the three inputs of AND circuit 131 conditions it and allows the pulses from the output of T2 trigger 128 to pass through the gate 131 to the input of the delay line 136. The pulses which are applied to the input of the delay line 136 are also taken off over line 138 and applied to one input of a three input gate circuit 140. Another input of the gate circuit 140 is the output line of the inverter circuit 134. Since at the application of the first pulse to the delay line 136, there is as yet no input signal to the inverter circuit 134, a signal is produced at the output of the inverter 134 which is applied to the second input of the gate circuit 140. The third input of the gate circuit 140 is the advance access interlock line 143. When a signal is present on line 143, gate 140 is conditioned to pass the first pulse which is shown on line *f* of FIG. 6. This is the gated Y pulse which is used to control the updating of the Field Length Register 28.

The line 145 which is connected to the center tap of the delay line 136 feeds one input of another gate circuit 147. The pulse produced at the center tap one pulse period after a pulse is applied is passed through the gate 147 when an advance access interlock signal is present. This pulse is the gated X pulse which is used to control the operation for extracting a Byte of information from the Register 16. During the time that the gated X pulse is produced at the output of gate 147, the gate 140 is blocked since there is no input pulse to the delay line 136. The output of gate circuit 147 is shown on line *g* of FIG. 6.

A pulse appears on output line 149 of the delay line 136 two pulse periods after the initial pulse was applied. The pulse on line 149 is applied to one input of a gate circuit 151 whose other input is the advance access interlock line 143. The output of the gate circuit 151 is the gated Z pulse which controls the updating of the Bit Address Register 26. This pulse is shown on line *h*, FIG. 6. The pulse on line 149 is also applied to the input of inverter circuit 134. The appearance of a pulse on line 149 deconditions AND circuit 131 since inverter 134 produces no output signal, so that the second pulse shown on line *d* of FIG. 6 and also shown as the dotted pulse on line *f* of FIG. 6 is blocked from the input of the delay line 136. During the interval that the gated Z pulse is produced, no signal is produced at the output of gate 140 since there is no signal produced by inverter 134. Gate 147 produces no signal since there is no input to the gate on line 145. In this manner, the gated Y, X and Z pulses are produced at predetermined timed intervals.

The sequence of gated Y, X and Z pulses is recurrently produced by the local clock circuits of FIG. 6 the number of times necessary for the complete extraction of the Data Word. It should be noted that the gated Y, X and Z pulses are not produced when there is no signal present on the advance access interlock line 143. This condition occurs when the data present in the Register 16 is not sufficient or is not the correct data to be extracted. This novel feature is a safety feature which prevents the performance of useless data extraction operations and will be described more in detail later. It should also be noted that the production of the gated Y, X and Z pulses is stopped when the extraction operation is completed, i.e. when the Field Length is equal to zero Bits or the Field Length is overdrawn. The overdrawn condition occurs when the last Byte extracted is greater in size than the number of Bits required to reduce the Field Length to zero Bits. These conditions are represented during Y time by the absence of a signal on line 203. An inverter 205 is connected to line 203, and when no signal is present on the line, a signal is produced at the output line 207 of the inverter 205. Line 207 is connected to one input of an AND circuit 133 (FIG. 6), whose other input is the gated Y pulse line. When an overdraw occurs, AND current 133 is conditioned, thereby providing an input to inverter 132 which blocks the AND circuit 131. The delay line 136 still produces one more X and Z pulse, to complete the extraction of the last Byte, in response to the pulse already in the delay line 136. The generation of the pulses from the T2 trigger 128 is also stopped when an overdraw or operation completed signal is produced. This is accomplished by AND circuit 155 which has as one of its inputs the gated Y pulse and the overdraw signal as its other input. When these two signals occur at the input of AND circuit 155 a pulse is produced to turn the trigger 124 off, thereby blocking the pulses from oscillator 120 from passing through AND circuit 122.

Reference is again made to FIG. 2 for a discussion of the advance access interlock signal on line 143. As previously stated, lines 35, 37 and 40 of Bit Address Register 26 are up in response to the application of the Bit Address signifying a starting position at Bit 29. The outputs of the three higher order Bit triggers 30 of the Bit Address Register 26 are connected to two levels of AND circuits 52 and 63, in the manner shown, with the output line from trigger 30*f* only being connected to the AND circuit 63. Signals are produced at the output of a respective AND circuit 52 in response to Bit Addresses in the Register 26 of corresponding parts of the left hand and the right hand halves of a register. For example, as connected, AND gate 52*a* generates an output signal when the Bit Address is in the range from 0–7 (first 8 Bits of the left-hand half of a register) or in the range from 32–39 (first 8 Bits of the right-hand half of the register) since lines 36 and 78 are always up for these Bit Addresses. Similarly, output signals are generated by AND circuit 52*b* in response to Bit Addresses in the range from 8–15 or 40–47; signals are generated by circuit 52*c* when the BIT Address is in the range from 16–23 or 48–55; and by circuit 52*d* when the Bit Address is from 24–31 or 56–63.

The output lines of each of the AND circuits 52 are connected to one of the inputs of a pair of AND circuits 63, which are of the three input type. Each circuit of the pair of AND circuits also has connected to it either the true or the complementary output signal line of trigger 30*f*. A signal present on the true or complementary line determines which of the AND circuits 63 of the pair is to be conditioned. To illustrate the operation of these circuits, consider the case where the Bit Address was Bit 29. In this instance, AND circuit 52*d* generates an output signal which is applied to the inputs of AND circuits 63*g* and 63*h*. Since line 40 is up and line 39 is down, AND gate 63*h* is deconditioned and cannot generate a signal. AND gate 63*g* can be conditioned to produce a signal.

The third input of each of the AND circuits 63 is connected to one of the output lines of a plurality of logical circuits which are connected to the Field Length Register triggers 29. The AND circuits 63 serve to combine Bit Address groups 0–7, 8–15 . . . 56–63 with the predetermined Field Length points or values to determine whether an access to the computer memory could be required. If there is no requirement for an access to the memory, all the data desired exists in the Register 16 and an advance access interlock signal is produced. This is accomplished in the following manner.

In order to determine the points of the Field Length, the AND circuits 58 and the OR circuits 59 are connected as a decoder to the triggers 29 of the Field Length Register 28 in the manner shown. It can be seen that a signal is produced at the output of OR circuit 59*e* in response to Field Length of 25–32 Bits; a signal is produced at the output of AND circuit 58*c* in response to Field Lengths of 17–23 and 48 Bits. A signal is produced at the output of AND circuit 58*d* in response to Field Lengths of 9–63 Bits; and a signal is produced at the output of OR circuit 59*f* in response to Field Lengths of 1–63 Bits. In the case where the Field Length is 28 Bits, signals are produced on the output line of AND circuit 58*d* and OR circuit 59*f*. These lines, which are connected to AND circuits 63, can only condition AND circuit 63*g*, since the rest of the AND circuits 63 are deconditioned by the action of the AND circuits 52 and the signals originating from trigger 30*f*.

The first W2D1 pulse from the memory cycle, as previously stated, switches trigger 18 to a condition where line 82 is down and line 20 is up. Line 82 being down blocks AND circuits 87 whose outer input is the AND circuit 63*g*. Therefore, no signal is produced at the output of AND circuit 87. The signal on line 20 is supplied to one input of another AND circuit 91 whose other input is the output line of AND circuit 63*h*, which under the conditions previously explained, has no output signal. This combination of events blocks AND circuit 91 also, so that no signal is produced at its output. The output lines of each of AND circuits 87 and 91 are connected to the input of an OR circuit 93. Since there is no signal present on either of its input lines, OR circuit 93 also has no output signal. The zero output signal condition at the output line of OR circuit 93 is inverted by an inverter circuit 95 to produce an output signal on line 143 which is the advance access interlock signal which is used to gate AND circuits 140, 147 and 151 for the Y, X and Z pulses.

Memory Word 129 now being stored in the Register 16 and the clock circuits of FIG. 6 being actuated to produce the gating pulses, the system is now ready for operation to extract the Data Word. The first portion of the operation performed is that of updating the Field Length information during the Y interval of time, which occurs first during the timing cycle shown in FIG. 7*i*. Since the original Field Length set into the Field Length Register 28 was 38 Bits, it must be reduced by 8 Bits to 30 Bits in order to keep in step with the 8 Bit Byte which is to be extracted from the Register 16. For this operation, reference is made to FIG. 5 which shows the logical circuits used to update the Field Length Register 28.

The updating of the Field Length Register 28 is accomplished by performing a binary subtraction operation of the number 8 from the number 38 to reduce the Field Length information to the number 30. The subtraction is performed by circuits which perform a binary addition of the number 38 and the complement of the number 8. This general technique is well known. When the addition is completed, the total is 30, which is the Field Length required for the second Byte. The binary addition operation is as follows:

```
1 0 0 1 1 0=38
1 1 0 1 1 1=complement of 8
-----------
0 1 1 1 0 1=sum
          1=end around carry
-----------
0 1 1 1 1 0=30; final sum out to update contents of Field Length
                Register
```

By performing similar additions of the Field Length and the complement of the Byte size, other Field Lengths may be obtained. The additions of Field Lengths, of zero Bits, signifying the end of the extraction operation and an overdraw condition, i.e. the Byte size being greater than the original Field Length, to the complement of the Byte size are also shown.

In the first case, assuming a Field Length of 8 Bits and a Byte size of 8 Bits, the addition operation is as follows:

```
0 0 1 0 0 0=Field Length of 8 Bits
1 1 0 1 1 1=complement of 8
-----------
1 1 1 1 1 1=sum of 63, indicating the operation is complete; no
            end-around carry
```

It can be shown that the end-around carry is produced only when the Field Length, to which the complement of the Byte size (here 8 Bits) is to be added, is one Bit greater than the Byte Size (i.e. 9 Bits). Therefore, the absence of the end-around carry signal may be used to indicate that the extraction operation is complete (Field Length equal to zero Bits) or that an overdraw was made.

The binary addition operation set forth above is accomplished by the circuits of FIG. 5 in the following manner. The output lines 46–51 of the triggers 29 of the Field Length Register 28 are connected to the inputs of respective AND circuits 175*a*–175*f*, each of which circuit has its other input connected to the line on which the gated Y pulse is produced. Since the Field Length Register is originally set for the number 38, lines 47, 48 and 51 are up, thereby producing a signal at the outputs of respective AND circuits 175*b*, 175*c* and 175*f*, the three remaining AND circuits 175*a*, 175*d* and 175*e* being blocked. Each of the output lines of the AND circuits 175*a*–175*f* is connected to the input of a respective OR circuit 180a–180f, the output of the OR circuits 180a–180f being connected to a respective binary adder 183a–183f. The binary adders 183 are of any standard type, for example, those shown in the textbook "Digital Computers" by Richards, published by D. Van Nostrand & Company, 1958, at pages 169–171.

In order to perform the addition, the true signal output lines of the triggers 31a, 31b and 31c of the Byte Size Register 27 are respectively connected to the inputs of inverter circuits 185a, 185b and 185c. The inverters 185 produce the complement of the Byte size signal. The complementary signal output lines of the triggers 31 are all connected to a three input AND circuit 187. The outputs of the inverter circuits 185 are connected to respective AND circuits 189a, 189b and 189c while the output of AND circuit 187 is connected to one input of an EXCLUSIVE OR circuit 190. The other input of the circuits 189 and 190 is the line on which the gated Y signal appears. The output lines of the AND circuits 189 and circuit 190 are in turn connected to a plurality of OR circuits 192.

In the case where the Byte size is 8 and all of the true signal output lines of the triggers 31 are down, by special definition, there are no input signals applied to any of the inverter circuits 185. In this instance, the inverters 185 all produce signals and, therefore, the gates 189 are opened when the Y pulse is applied. This means that signals are produced at the outputs of OR circuits 192a, 192b and 192c. Since there are signals produced on all of the complementary output signal line of the triggers 31, there is an output signal from the AND circuit 187. However, since the gated Y pulse is applied to the input of EXCLUSIVE OR circuit 190, this means that no signal is produced at its output. This in turn means that no signal is produced at the output of OR circuit 192d.

The outputs of the OR circuits 192 are connected to the inputs of the respective binary adders 183a, 183b, 183c and 183d. The addition example previously set forth takes place in the adders of 183 in a well known manner and the end-around carry signal is produced on line 195 which is connected to the output of binary adder 183f. This end-around carry signal is applied to the input of an AND circuit 197 whose other input is the gated Y pulse line. Since circuit 197 is gated open during Y time, the end-around carry signal is applied back to binary adder 183a, to complete the addition operation thereby producing signals on the output lines of adders 183b, 183c, 183d and 183e. The signals on these lines are representative of the binary number 30, the new Field Length.

The output signals from the adders 183a–183f are connected to respective AND circuits 200a–200f whose other input is the gated Y pulse line. The outputs of circuits 200 are connected to the triggers 29 of the Field Length Register 28. Therefore, any signals which are present at the inputs to AND circuits 200 are gated through during the Y interval and applied to the triggers 29 of the Field Length Register 28, to update the Field Length for the next Byte. This updating process is carried out during every Y interval until the Field Length is reduced to 0 Bits or there is an overdraw, at which times no end-around carry signal is produced on line 195.

The production of a signal at the output of AND circuit 197 in response to the gated Y pulse and the end-around carry signal results in no signal being applied over the (+) overdraw line 207 to the input of AND circuit 133 (FIG. 6) AND circuit 133 is blocked, thereby producing a signal at the output of inverter 132 which keeps AND circuit 131 conditioned for the production of the Y, X and Z pulses.

Line 207 is also connected to the input of AND circuit 155 (FIG. 6), whose other input is the gated Y pulse line. When there is an end-around carry signal on line 195 during Y time, there is no signal on line 207 and AND circuit 155 is deconditioned, thereby leaving trigger 124 (FIG. 6) on. Should the extraction operation be complete or an overdraw, as would be signified by the absence of an end-around carry signal on line 195, there would be a signal present on line 207 during Y time, which in conjunction with the gated Y signal would condition AND circuit 155 to generate a signal to turn trigger 124 off thereby stopping the production of the pulses by the T2 trigger 128. This in turn stops the production of the gated Y, X and Z pulses and completes the data extraction operation.

In this manner, the Field Length is reduced prior to the extraction of a Byte of data in order to compensate for the future reduction of the number of Bits left to be extracted to form the Data Word. Reduction of the Field Length continues until it is equal to zero Bits or else there is an overdraw. When either of these two conditions occur, the clock circuits of FIG. 6 are stopped and the data extraction operation is completed.

Figure 9:
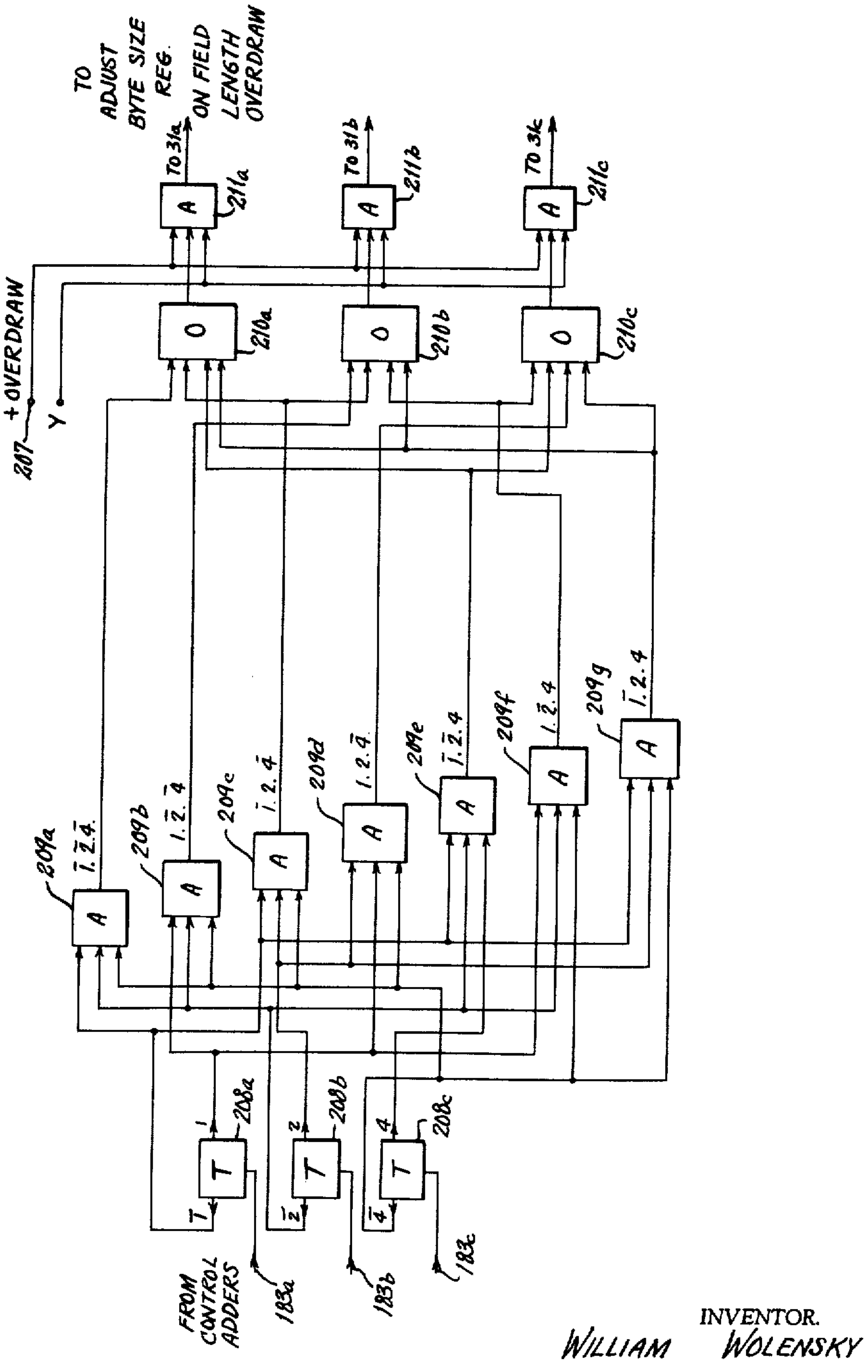
FIG. 9 is a schematic block diagram of the overdraw decoder.

When an overdraw signal is produced, during Y time, the Byte Size Register 27 should be adjusted so that the proper information concerning the next Byte may be supplied to a Byte Masking Decoder 250, whose function is to mask out the correct Bits, read out of the Register 16, corresponding to the overdraw. The updating of the Byte Size Register 27 is accomplished by an overdraw decoder 212 which is shown in FIG. 9. It should be remembered that the overdraw decoder 212 functions only when there is an overdraw signal produced on line 207. Referring to FIG. 9, the output lines from the three low order binary adders 183a, 183b, and 183c are respectively connected to the inputs of triggers 208a, 208b and 208c. A signal appears on the true or complementary signal output line of the triggers 208 in accordance with the input from the respective binary adder 183, a signal appearing on the true line in response to being set to binary 1 and a signal appearing on the complementary line in response to being set to binary 0. The true and complementary signal output lines of the triggers 208 are connected as shown to a plurality of three input AND circuits 208, each of which produces a signal on its respective output line in accordance with combinations of true and complementary signals generated by triggers 208.

The output lines of the AND circuits 209 are connected as shown to OR circuits 210a, 210b and 210c, whose output lines in turn are respectively connected to one of the inputs of the AND circuits 211a, 211b and 211c. The outputs of the AND circuits are fed to triggers 31a, 31b and 31c of the Byte Size Register. The signals at the ouput lines of AND circuits 211 serve to switch the triggers 31 to conditions which produce signal representative of the Byte size for the next Byte to be extracted. This information is utilized by the Byte Masking Decoder 250, to be described.

Figure 5:
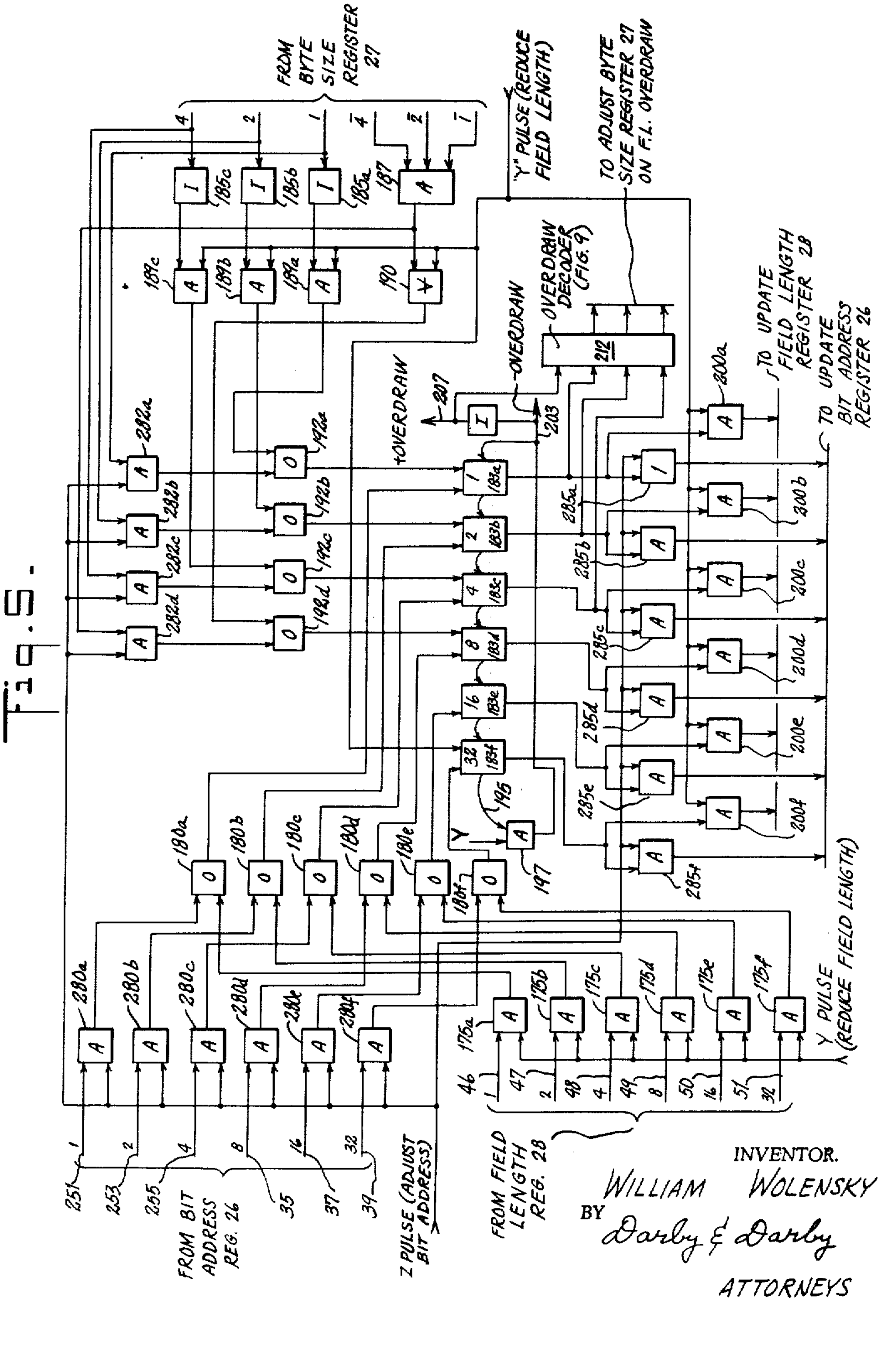
FIG. 5 is a schematic block diagram of the Bit address and Field Length modification circuits.

When an end-around carry is produced on line 195 of FIG. 5, the AND circuits 211 of the overdraw decoder are blocked, since another of their inputs is the (+) overdraw line 207, which has no signal in it when the end-around carry is produced. This occurs during Y time when the Field Length is greater than the Byte Size, here 8 Bits. When there is a signal present on line 207, indicating an overdraw, the respective AND circuits 211 are conditioned by the gated Y pulse if a signal is present on a respectively connected OR circuit 210. The presence or absence of signals on the output lines of the AND circuits 211 is used to control the switching of the triggers 31.

Tabulated below are the three low order Bits produced by the binary adders 183a, 183b and 183 c for overdraw conditions of from 0 to 7 Bits. Also tabulated are the lines of the triggers 208 which are up, the AND circuit 209 on whose output line a signal is produced, and the AND circuits 211 at whose outputs signals are produced.

| Overdraw | Bits yet to be extracted | Signals From— | | | | |
|---|---|---|---|---|---|---|
| | | Triggers 208 | AND 209 | AND 211a | AND 211b | AND 211c |
| 0 | 8 | 1 2 4 | None | 0 | 0 | 0 |
| 1 | 7 | $\bar{1}$ 2 4 | 209g | 1 | 1 | 1 |
| 2 | 6 | 1 $\bar{2}$ 4 | 209f | 1 | 1 | 1 |
| 3 | 5 | $\bar{1}$ $\bar{2}$ 4 | 209e | 1 | 0 | 1 |
| 4 | 4 | 1 2 $\bar{4}$ | 209d | 1 | 0 | 0 |
| 5 | 3 | $\bar{1}$ 2 $\bar{4}$ | 209c | 0 | 1 | 1 |
| 6 | 2 | 1 $\bar{2}$ 4 | 209b | 0 | 1 | 0 |
| 7 | 1 | $\bar{1}$ 2 $\bar{4}$ | 209a | 0 | 0 | 1 |

When the Field Length is greater than the Byte size, as in the case previously discussed wherein the Field Length was set to 30 Bits, no overdraw signal is produced and the triggers 31 produce all complementary signals for a Byte size of 8 Bits.

Figure 3D:
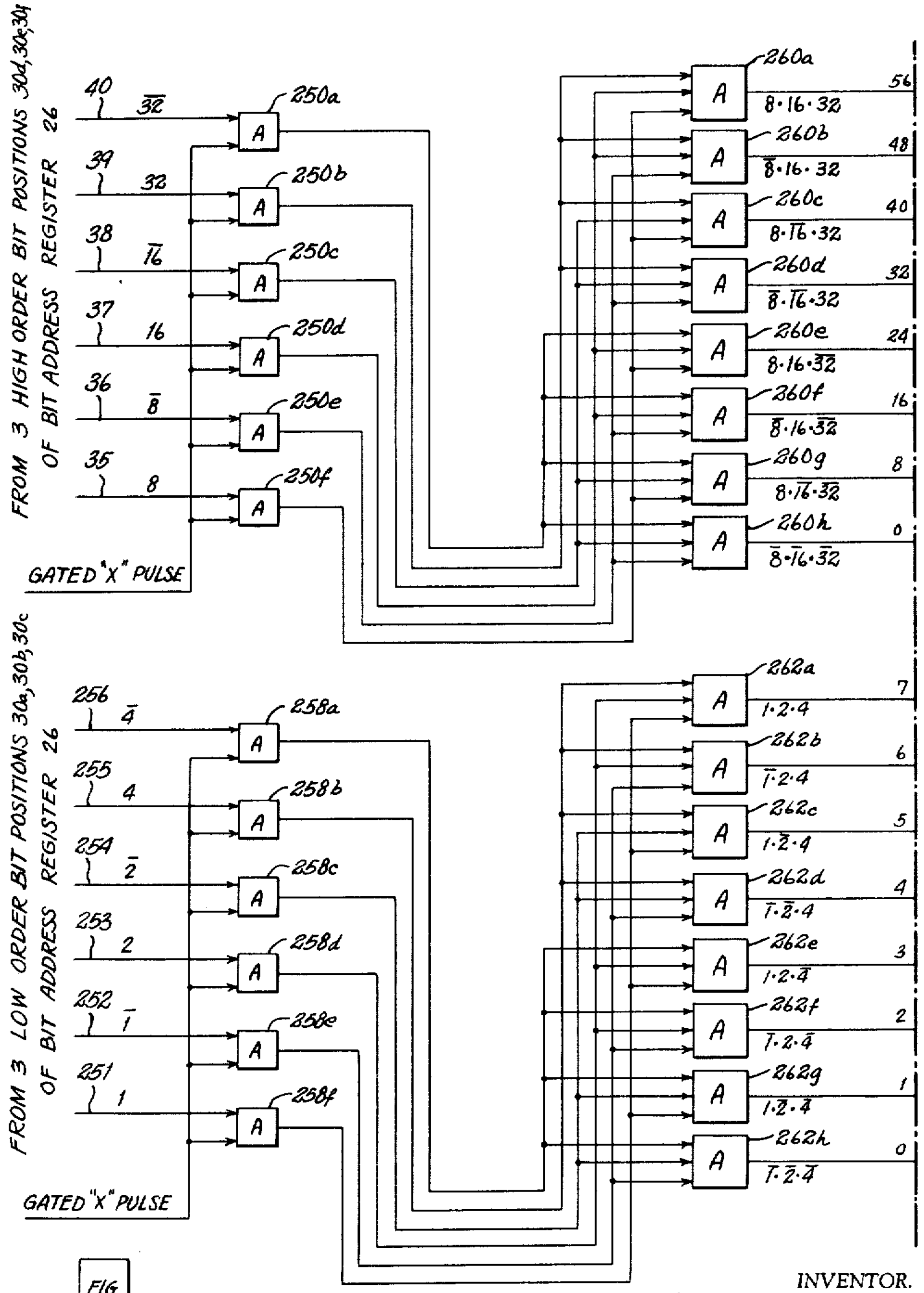
FIG. 3D is the intermediate layout for FIGS. 3A–3C.
Figure 3A:
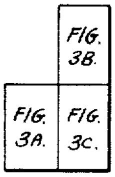
FIGS. 3A–3C are schematic block diagrams of a 6 x 64 logical decoder.
Figure 3B:
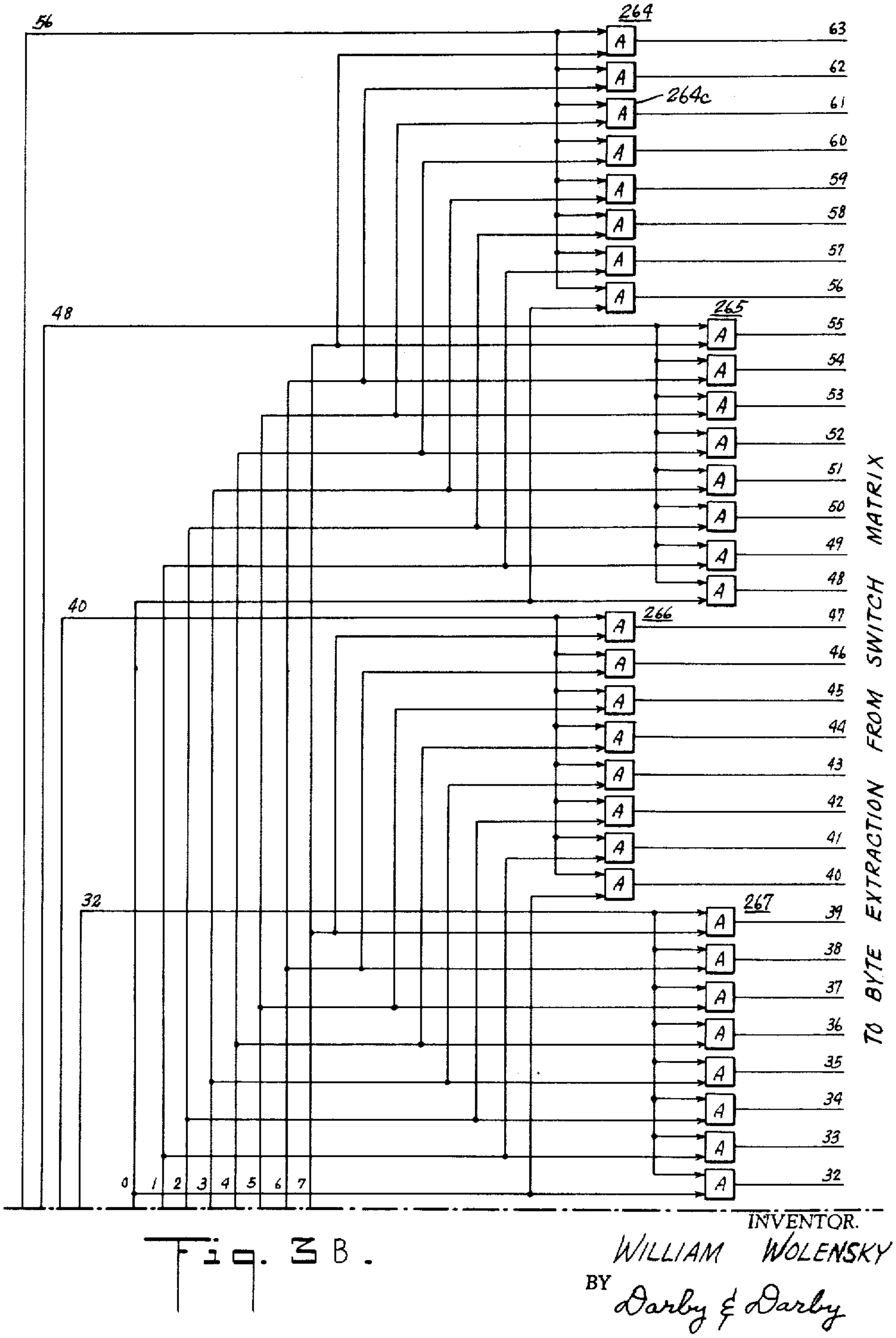
Figure 3C:
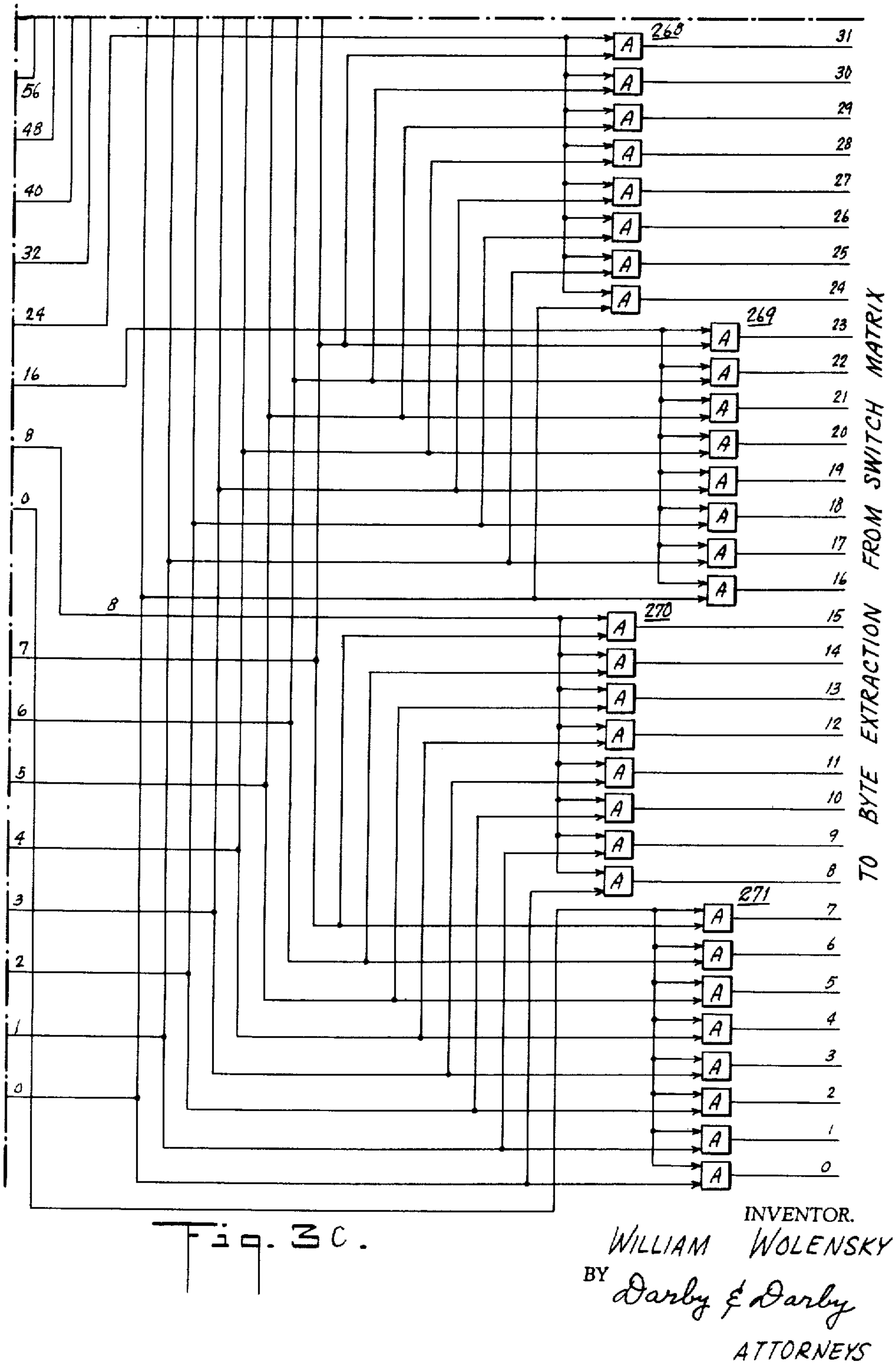

After the Field Length reduction operation is completed, the gated X pulse is produced to control the extraction of a Byte of information which is stored in the Register 16. For a description of the components used during this operation, reference is made to FIG. 8 which illustratively shows a section of a continuous stream type register, one type of register with which the principle of this invention may be utilized, from which the data is extracted. Reference is also made to FIGS. 3A–3C which show details of the Bit Address Decoder 105 which is used to control the extraction of the Bits of data from the Register 16. The Register 16 of FIG. 8 is formed by a number of triggers 215, which are used as storage elements, equal to the number of Bits of information in a Memory Word. The triggers 215 are switched to a condition which is representative of one of the Bits of data supplied to it from a Memory Word, in this case Memory Word 129. The output of each of the triggers 215 is connected to the column line 217 of a single level matrix 216. A number of row lines 218, which are preferably equal to the number of Bits in the maximum size Byte, which is to be used with the intersect each of the column lines 217. The row lines 218 face the matrix output line in this instance. A plurality of control lines 220, each originating at the Bit Address Decoder 105 crosses each intersection of a column line 217 and a row line 218 and serve to control the selection of a Byte of data from the Register 16.

Located at each intersection of a column line 217, a row line 218 and a control line 220 is a suitable switching element 223 which may for purposes of explanation be considered an AND circuit. The switching elements 223 are used to transfer the information from the triggers 215 onto the output lines 218 to a Byte Masking Decoder 250. The switching elements 223 may be any suitable circuit component, for example, a PNP transistor. It should be realized that other suitable components may be used, for example, diodes, vacuum tubes, etc.

Each of the control lines 220 is connected to the switching elements 223 which are associated with 8 consecutive triggers 215, i.e., 8 consecutive Bits of data. By providing the proper number of control lines, properly connected, a control line 220 may be energized so that 8 consecutive Bits of data may be selected from the Register 16, beginning at any Bit position of the Register. In the illustrative embodiment of the invention shown and described, it has been assumed that each Memory Word contains 64 Bits of information. The matrix of the Register 16 is provided with 64 control lines corresponding to the 64 outputs of the Bit Address Decoder 105, in order that a Byte may be selected from the Register beginning at any Bit position.

The operation of the single level matrix for the Register 16 is as follows. Consider the case where PNP transistors are used as the switching elements 223. The column lines 217 are connected to the base electrodes of the transistors along the column lines, the row output lines 218 are connected to the collector electrodes of the respective transistors located along the row, while the control lines 220 are connected to the emitter electrodes of the transistors in a manner which is representative of the information stored in each trigger. For example, if one of the triggers is switched so as to present a binary 1 digit, the base electrodes of the transistors located along the column line 217 which is connected to that trigger would be biased in such a manner so as to become conductive when a drive pulse is supplied to the control line 220 to which the transistor is connected.

Due to the arrangement of the single level matrix 216 of the Register 16, a Byte can be read out onto the row lines 218 starting at any Bit position of the Register. For example, referring to FIG. 8, if the Byte desired to be read out begins with Bit $n$ and ends with Bit $n+7$, the decoder 105 would function in a manner to produce a positive drive pulse on control line 220($h$) thereby rendering conductive those transistors which are connected to a trigger 215 storing binary 0's. The pulses produced by the transistors which are made conductive are conveyed down the row output lines 218. If it were desired to read out an 8 Bit Byte beginning at Bit position $n+1$, the Bit Address Decoder 105 would function so as to energize control line 220 ($n+1$), thereby reading out the information applied to the transistors located along it. In this manner, a Byte may be extracted from the Register 16 beginning at any Bit position.

Referring to FIGS. 3A, 3B and 3C, the logical circuitry forming the decoder 105 is shown. The true and complementary signal output lines 35–40 of the three high order Bit Address triggers 30$d$, 30$e$ and 30$f$ are connected to the inputs of a plurality of AND circuits 250. The true or complementary signal which each line represents is marked on top of the appropriate line. Those lines which are marked for a true signal, e.g. 8, 16 and 32 are connected to the respective true output lines 35, 37 and 39 of the triggers 30, and those which are marked with the complementary signal, e.g. $\bar{8}$, $\overline{16}$ and $\overline{32}$, are connected to the complementary signal lines 36, 38 and 40 of the triggers 30. The true and complementary signal output lines 251–256 of the three lower Bit order triggers 30$a$, 30$b$ and 30$c$ of the Bit Address Register 26 are connected to a plurality of AND circuits 258. Each of the AND circuits 250 and 258 has as its other input the gated X pulse line which originates from the output of AND circuit 147 (FIG. 6). When the gated X pulse is applied, the AND circuits 250 and 255 produce signals on their output lines in accordance with the signals which are present on the input lines from the triggers 30. In the present example, since the Bit Address Register was applied with the number 29, lines 40, 37, 35, 255, 254, and 251 are up, thereby producing signals on the output lines of respective AND circuits 250$a$, 250$b$, 250$f$, 258$b$, 258$c$ and 258$f$, under the gated X pulse is applied.

The output lines of the AND circuits 250 and 258 are respectively connected as shown in FIG. 3A to the inputs of a plurality of AND circuits 260 and 262. The AND circuits 260 and 262 produce signals on their respective output lines in response to various combinations of true and complementary signals applied to the AND circuits 250 and 258. These various combinations of true and complementary signals are shown under each of the output lines of AND circuits 260 and 262. For example, a signal is produced on the output line of AND circuit 260$e$ when signals are present on input lines 35, 37 and 40. The AND circuits 262 function in the same manner. The number written above the output line of each of the AND circuits 260 and 262 represents the number which the signal present on that output line would be representative of. Thus, a signal appearing on the output line of AND circuit 262$e$ is representative of the number 24. In response to the output signals from AND circuits 250 and 258, signals are produced on the output lines of AND circuits 260*e* and 262*c*, which are representative of the numbers 24 and 5, whose sum is equal to 29, the present Bit Address.

To expand the decoder to a 64-position output, the output line from AND circuit 260*a*, representative of the number 56, is connected to one of the inputs of each of a plurality of AND circuits 264 (FIG. 3B). The other input to each of the AND circuits 264 is the output line of one of the AND circuits 262, which is representative of the binary digits 0–7. An AND circuit 264 becomes conditioned and produces a signal on its output line when a signal is produced at the output of AND circuit 260*a* and one of the AND circuits 262.

Each of the output lines of the AND circuits 264 are connected to the control lines 220 of the first level matrix 216. A suitable driver may be connected between the output of the decoder 105, if desired, to provide adequate power for the drive function to read the Byte out of the Register 16. The output lines of the AND circuits 264 control the selection of Bytes of data from the Register 16 beginning with the Bit position shown on each of the output lines. Thus, AND circuits 264 control the lines which read out Bytes starting at Bit position 56 to Bit position 63. It should be realized that Register 16 is of continuous construction and that the selection of an 8-Bit Byte beginning at Bit 60, for example, would result in Bits 60–63 and Bits 0–3 being read out.

In a similar manner, the output line of AND circuit 260*b*, representative of the number 48, and the output lines from the AND circuits 262 are connected to a plurality of AND circuits 265 which produce signals on output lines connected to the drive lines 220 which select Bytes of information beginning with Bits 48–55. As can be seen in drawings, FIGS. 3B and 3C, the outputs of AND circuits 260 and 262 are connected through similar arrangements of AND circuits 266–271 to produce the drive pulses on any one of the number of control lines from 0–63. This enables a Byte to be selected from the Register 16 beginning at any Bit position from 0–63.

In the present example where the Bit Address is 29, signals are produced at the outputs of AND circuits 260*e* and 262*c*. This results in the production of a signal at the output of AND circuit 268 which is the control line 220 (FIG. 8?), for extracting a Byte of information from the Register 16, beginning with Bit 29 and ending with Bit 36. In a similar manner, by the application of the correct signals from the Bit Address Register 26, the control line 220 may be energized to select a Byte of information from the Register 16, beginning at the proper Bit.

Figure 4:
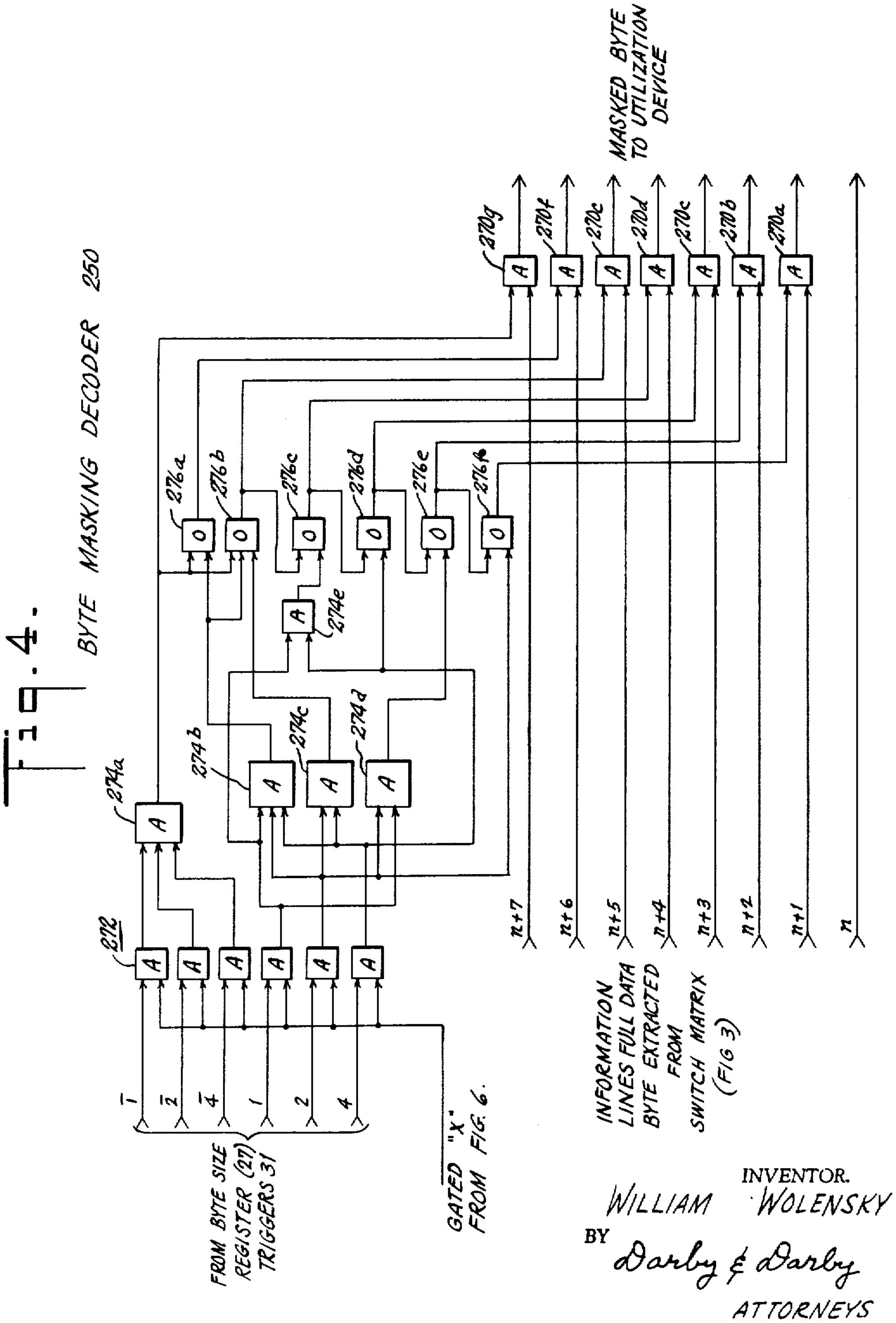
FIG. 4 is a block diagrammatic representation of a Byte masking decoder.

When a control line 220 is energized, the information which is associated with the switching elements located along it is read out, and transferred to the input of a Byte Masking Decoder 250, shown in FIG. 4 A Byte of information read out of the Register 16 is applied over the respective lines $n$, $n+1$ . . . $n+7$ to the Byte Masking Decoder 250. The lines $n+1$ . . . $n+7$ are respectively connected to the inputs of a plurality of OR circuits 270*a*–270*g* whose output lines are directly connected to the utilization device, which for example, may be the computer arithmetic unit or logic processor. The $n$ line is connected directly to the utilization device.

The Masking Decoder 250 receives the Byte Size signals from the true and complementary signal output lines of the Byte Size Register triggers 31. The outputs of the triggers 31 was adjusted during Y times as previously discussed with respect to the overdraw decoder of FIG. 9. These Byte Size control signals determine how many of the Bits of data applied to AND circuits 270*a*–270*g*, in addition to the Bit on line $n$, are to pass to the utilization device. The Bit on line $n$ is always present since the Byte size is never less than one Bit.

Each of the true and complementary signal lines of the triggers 31 is connected to one input of an AND circuit 272. The other input to all of the AND circuits 272 is the gated X pulse from the clock circuits of FIG. 6. The output lines of the AND circuits 272 are connected to the inputs of a plurality of AND circuits 274 whose function is to produce signals on their respective output lines, during X time, in response to combinations of true and complementary signals applied to the inputs of AND circuits 272. Remembering the special code which was assigned to the Byte Size Register 27 when the Byte Size is 8 Bits, i.e. all complementary signals, a signal is produced at the output of AND circuit 274*a*. Similarly, AND circuit 274*b* is conditioned in response to a Byte Size of 7 Bits, AND circuit 274*c* is conditioned in response to a Byte Size of 6 Bits, circuit 274*d* to a Byte Size of 3 Bits and circuit 274*e* is conditioned in response to a Byte Size of 5 Bits.

The output lines of the AND circuits 274 are connected to the inputs of a group of OR circuits 276, all but one of which (276*a*) are connected in a series arrangement. OR circuit 276*a* receives the 8 and 7 Bit signals; 276*b* the 8, 7 and 6 Bit signals; 276*c* the 5 Bit signal and 276*e* the 3 Bit signal from the respective AND circuits 274. The output lines of the AND circuits 272 which respond to the true signals from triggers 31*b* and 31*c*, i.e. a Byte Size signal of 2 and 4 Bits, respectively, are directly connected to OR circuits 276*f* and 276*d*. Therefore, an OR circuit 276 generates a signal on its respective output line whenever the Byte size is the number of Bits necessary to apply a signal to its input. The latter function is accomplished by AND circuits 272 and 274.

All of the AND circuits 270, except 270*g*, to which the Byte of data extracted from the Register 16 is applied, are under the control of the OR circuits 276. For example, when the Byte Size Register 27 is set to a Byte Size of 8 Bits, signals are present at the output of AND circuit 274*a* and, therefore, at the outputs of OR circuits 276*a* and 276*b* and on the line directly connected to AND circuit 270*g*. The signal at the output of AND circuit 274*a* directly conditions AND circuit 270*g*, while the signal from OR circuit 276*a* conditions AND circuit 270*f* and the signal from OR circuit 276*b* conditions AND circuit 270*e*. The signal at the output of OR circuit 276*b* is also applied to the input of OR circuit 276*c* and the remaining OR circuits 276*d*–276*f* due to the series connection of circuits 276*b*–276*f*. Signals are generated on the output lines of each of OR circuits 276*c*–276*f* when OR circuit 276*b* receives an input signal. The signals at the outputs of OR circuits 276*c*–276*f*, respectively, condition AND circuits 270*d*, 270*c*, 270*b* and 270*a*, thereby allowing the full 8 Bit Byte extracted from the Register 16 to pass through the AND circuits 270 and over line $n$.

If the Bit Size set into the Register 27 during Y time is less than 8 Bits, signals are produced at the outputs of the OR circuits 276 so that suitable ones of the AND circuits 270 are deconditioned, thereby masking certain extracted Bits from being passed to the utilization device. To illustrate this condition, consider the case where the Byte Size is only 4 Bits. In this instance, none of the AND circuits 274 have an output, but a signal is supplied to the input of OR circuit 276*d* directly from the AND circuit 272, which is controlled by the true signal line of trigger 31*c*. This signal produces signals at the outputs of respective OR circuits 276*d*, 276*e* and 276*f*, therefore conditioning AND circuits 270*a*, 270*b* and 270*c*. This allows Bits $n$ to $n+3$ to pass to the utilization device.

It has been shown that during X time, a Byte of data is extracted from the Register 16 by the single level matrix 216 of FIG. 3 and that the Byte Masking Decoder 250 may be operated to mask out certain undesired Bits of the Byte. Byte sizes of any number of Bits may be formed by this arrangement since the Byte Masking Decoder 250 is capable of masking any number of the Bits which are extracted in accordance with the settings of the triggers 31. Therefore, it is possible to use the system of the present invention with Byte Sizes of less than 8 Bits even though the single level matrix 216 is constructed to extract 8 Bits. The principles of the Byte Masking Decoder of this invention may be extended to construct a Decoder which will operate with Registers from which segments of information of greater than 8 Bits are extracted, to produce any desired size Byte.

The functions performed during X time being completed, the gated Z pulse is now generated. This pulse is used to control the updating of the Byte Address Register 26, by increasing its contents by the Byte Size, to prepare it to have the correct Bit Address for the extraction of the next Byte. Reference is again made to FIG. 5, which shows the logical circuits used for accomplishing the updating of the Bit Address Register 26. The true signal lines from the respective Bit Address triggers 30*a*–30*f* are, respectively, connected to one input of each of a plurality of AND circuits 280*a*–280*f*. The other input to all of the AND circuits 280 is the gated Z pulse line. The output lines of AND circuits 280*a*–280*f* are respectively connected to the inputs of the OR circuits 180*a*–180*f* whose outputs are, in turn, respectively connected to the inputs of binary adders 183*a*–183*f*. In this manner, the information of the present Bit Address is supplied to the binary adders 183 upon the occurrence of a Z pulse. The information necessary to update the Bit Address Register 26 is supplied from the true and complementary signal output lines of the triggers 31 of the Byte Size Register 27, which are switched to conditions representative of the Byte Size during Y time. The true signal output lines of the triggers 31*a*–31*c* supply information representative of Byte Sizes from 1 to 7 Bits and are respectively connected to one of the inputs of AND circuits 282*a*–282*c*. In order to provide the signal for an 8 Bit Byte the complementary signal output lines of the triggers 31*a*–31*c* are all connected to the EXCLUSIVE OR circuit 187, in a manner previously described, and an output line is taken from circuit 187 and connected to one input of an AND circuit 282*d*. The other input to the AND circuits 282 is the gated Z pulse output line.

The output of the AND circuits 282*a*–282*d* are respectively connected to the inputs of OR circuits 192*a*–192*d*, whose output lines are in turn, respectively, connected to the inputs of binary adders 183*a*–183*d*. A binary addition operation is performed during Z time by the binary adders 183 of the present Bit Address and the Byte size, in the manner previously described with respect to the updating of the Field Length Register 28. Using the case where the original Bit Address is 29, signals are applied to the inputs of binary adders 183*a*, 183*c*, 183*d* and 183*e* from the respective OR circuits 180. Since the Byte Size is 8 Bits, a signal is applied through OR circuit 192*d* to the input of adder 183*d*. The binary adders 183 perform the addition in response to these input signals and produce an output sum of 37, which is the starting Bit position for the second Byte, represented by signals on the output lines of adders 183*a*, 183*c* and 183*f*.

The output lines of the adders 183*a*–183*f* are respectively connected to one of the inputs of AND circuits 285*a*–285*f* whose output lines are in turn respectively connected to the inputs of triggers 30*a*–30*f* in the Bit Address Register 26. The other input to the AND circuits 285 is the gated Z pulse line. With the adders 183 producing a total of 37, in the present example, upon occurrence of the gated Z pulse, signals are produced on the output lines of AND circuits 285*a*, 285*c* and 285*f*. These signals make the triggers 30*a*, 30*c* and 30*f* generate signals on their true output signal lines while the absence of signals at the outputs of AND circuits 285*b*, 285*d* and 285*e* cause triggers 30*b*, 30*d* and 30*e* to produce signals on their complementary output signal lines. In this manner, the Bit Address Register 26 is updated to Bit Address 37. The updated information of the Register 26 is supplied to the Bit Address Decoder 105 to be used for the extraction of the next Byte, and is also supplied to the logic circuits 52 and 63 for the determination of whether a memory access is to be initiated.

To recapitulate, after the completion of the first cycle of the gated Y, X and Z pulses the system now has the following operating conditions: the Field Length Register 28 is set to 30 Bits; the Bit Address Register is set to produce signals representative of Bit position 37 and the Byte Size Register 27 is still set to a Byte Size of 8 Bits. The Word Address 130 is presently in the Word Address Register 30 and the whole Memory Word 129 is stored in the Register 16.

In extracting the first Byte beginning at Bit position 29 of Memory Word 129, the boundary between Bits 31 and 32 was crossed. It can readily be seen, that the data stored in the left half of Register 16 is no longer needed. For continuous extraction operation, the left half of the Register 16 should be loaded with the left half of Memory Word 130 while data is being extracted from the right half of Memory Word 129. The loading of a new Memory Word into the Buffer Register 72, from which halves of the Word are transferred to the Register 16 is called a memory access.

The AND circuits 63 are used to determine whether an access is to be initiated to the computer memory to load another Word into the Buffer Register 72. A general rule, when the memory access is required, is as follows: if the number of Bits in the Field Length (the Field Length in the Field Length Register 28 at any given instant), when combined with the Bit Address in the Bit Address Register 26, exceeds the distance to a boundary, then an advance access to the computer memory is required. This is accomplished in the present system by the AND circuits 63 which in effect combines Bit Address groups to points of Field Length. The Bit Address groups, e.g. 0–7, 8–15, 16–23, etc. are produced by the AND circuits 52 while the Field Length points are decoded by the logical decoder formed by the circuits 58 and 59 which convert Field Length as points greater than 0 Bits (output of OR 59*f*), greater than 8 Bits (output of AND 58*d*) etc.

The proper combination of a Bit Address group signal with a Field Length point signal determines the need for an additional access to the computer memory. This is manifested by a signal appearing at the output of one of the AND circuits 63, which signal is capable of reaching the input of OR circuit 64, which in turn controls the memory access. The application of the signal from an AND circuit 63 to the OR circuit 64 is controlled by AND circuits 60 and 88. AND gate 62 has one of its inputs connected to line 20 of trigger 18 while AND 88 has one of its inputs connected to line 82 of trigger 18. As was previously explained, the state of the trigger 18 is controlled by the W2D1 pulse from the computer execution control, and the state of the trigger 18 also determines which half of Register 16 is loaded, when a memory access is initiated. Therefore, when the combination of the Bit Address group signal and the Field Length point signal produces a signal at the input of one of the OR circuits 55 or 56 and the trigger 18 conditions the proper respective AND circuit 60 or 88, a memory access is initiated and one half of the Register 16 is loaded with the newly accessed Word upon the occurrence of the R3D3 pulse.

To illustrate the operation of the memory access circuits, consider the case where the Memory Word 130 is to be loaded into the left hand half of the Register 16 at the end of the first Byte extraction cycle. This is accomplished in the following manner. At the end of the first extraction cycle, the Bit Address, is Bit 37 and the Field Length has decreased to 30 Bits. Under these conditions of the Field Length being greater than the number of Bits left in the Register to the right of Bit 37, a signal is produced at the output of AND circuit 63*b*, thereby producing a signal at the output of OR circuit 55. Line 20 of the L/R trigger 18 being up, AND circuit 60 is conditioned, thereby producing a signal at the output of OR circuit 64, which conditions AND circuit 68 and turns on the single shot 69. This initiates a memory access so that the Memory Word Address 130 which was in the Registers 30 is relayed to the computer memory and Memory Word 130 is loaded in the Buffer Register 72. Memory Word 130 remains in the Buffer Register 72 until the left-hand gate 12 or the right-hand gate 14, both of which are now blocked, receives a gating pulse from AND circuits 10 or 11.

At time R3 of the second memory cycle the R3D3 pulse (see FIG. 7, line *e*) is applied over line 17 to the inputs of AND circuits 10 and 11. Since line 20 of the L/R trigger 18 is up, AND circuit 10 is conditioned and an access to the left half of Memory Word 130 is accomplished through the left half gates 12. The left half (Bits 0–31) of Memory Word 130 is now stored in the left half of the Register 16. The data of Word 130 is at present unused, since the second Byte starts at Bit 37, which is in the right half of Memory Word 129. The termination of the R3D3 blocks the gate 10, and the access to the Register 16 is completed.

At time W2 of the second memory cycle, the W2D1 pulse is applied over line 80 to the L/R trigger 18. This switches the trigger 18 so that line 82 is now up and line 20 is down, thereby terminating the memory access.

The above is all conditioned by the following boundary considerations: (*a*) to initiate an advance access to the computer memory, it must be known that it is required. This is determined by the AND circuits 63, and (*b*) it must be shown that a place is available for the data to be transferred to. This latter function is accomplished by the advance access interlock circuit, whose operation has been previously described, which prevents the filling of one half of the Register 16 until extraction of all pertinent data from that area is complete.

The extraction of the second, third and fourth Bytes from the Register 16 continues in the manner set forth above with respect to the first Byte. Since line 82 is down during this time and since no more W2D1 pulses are produced by the computer execution control, the Word Address Register 130 receives no shift signal. No more R3D3 pulses are supplied by the computer execution control during this period, so there is no access to the right half of Word 130 through the gate 14. The table shown in FIG. 10 shows the operations of the various circuits during the cycles of the extraction of the respective Bytes.

During the extraction of the second, third and fourth Bytes, no memory access to the Buffer Register 72 can occur. This is so because line 20 is down, thereby blocking AND current 60 so that no signal is produced by OR current 64. Since the Bit Address during these Bytes is always greater than Bit 31, in fact greater than Bit 37, no signal is produced at the output of OR circuit 56 and, therefore, AND circuit 88, another input to OR circuit 64, is also blocked. During the extraction of the second, third and fourth Bytes, no data is transferred to the right half of Register 16, since AND gate 11 is blocked, due to the non-occurrence of R3D3 pulses.

To illustrate the completion of the last cycle of operation of extracting a Data Word, again consider the previous example. Here the fifth cycle of operation completes the extraction of the desired Data Word. During Y time of the fifth cycle, an overdraw signal is produced on line 195 when the Field Length is adjusted. The overdraw signal is effective over line 207 through gate 155 (FIG. 6) during Y time to turn off trigger 124 thereby stopping the production of pulses by T2 trigger 128. The overdraw signal on line 207 also blocks AND gate 131. Since a gated Y pulse has already been produced and has been applied to delay line 136, the gated X and Z pulses are generated by the delay line.

Also during Y time of the fifth cycle, the Byte Size Register 27 is adjusted by the overdraw decoder 212 of FIG. 9 to produce output signals representative of a Byte Size Register triggers 31 which in turn condition the Byte Masking Decoder 250 (FIG. 4) to mask off two Bits of the next Byte extracted from the Register 16.

During X time of the fifth cycle, the Bit Address Decoder 105 (FIG. 3) produces a signal on the control line 220 of the single level matrix (FIG. 8) which reads an 8 Bit Byte of data out of the Register 16 beginning at Bit 61 of Memory Word 129 and ending at Bit 4 of Memory Word 130, which was previously loaded into the left half of the Register 16. The extracted Byte is supplied to the Byte Masking Decoder 250 which operates, in response to the signals from the Byte Size Register 27, to mask out Bits 3 and 4 of Word 130 while allowing the other 6 Bits to pass to the utilization device. This completes the extraction of the 38 Bit Data Word.

During the period of the last gated Z pulse, the Bit Address is updated in accordance with the last 6 Bit Byte. However, this new information is not necessary and is not utilized since the extraction operation was actually completed during the X pulse interval. Each of the Registers 26, 27, 28 and 30 now stand ready to receive new information for the extraction of another Data Word.

If the case is considered where the desired Data Word is long enough to extend into the right half of Memory Word 130, an R3D3 pulse would be applied to the AND currents 10 and 11 during the sixth cycle of operation. Since line 82 is up, AND circuit 11 is conditioned and the right half gates 14 are opened to load the Register 16 with the data of the right half of Data Word 130. This data would be ready for extraction during the 10th and subsequent Bytes of such an operation.

To illustrate the advance data access feature of the invention, let it be assumed that L/R trigger 18 did not get switched by the time that the fifth Byte would normally be extracted from the Register 16. This condition might occur due to a delay in the memory bus in providing the W2D1 pulse to bring line 20 down, completing the half Word access to the left half of Word 130. Following the decoding procedure previously described, it can be shown that with a Bit Address of 61, field length of 6 Bits, a Byte size of 8 Bits and trigger 18 set so that line 20 is up, a memory access will be initiated through AND circuit 60 and OR circuit 64. In this case, however, since line 20 is up and AND circuit **63*h* has an output, AND circuit 91 will have an output, which is inverted by inverter 95. The absence of a signal on the advance access interlock line 143 blocks AND gates 140, 147 and 151 (FIG. 6) from passing the Y, X and Z pulses. This prevents the extraction of the fifth Byte until the half Word access to the left half of Word 130 is completed to bring line 20 down. When line 20 goes down, gate 91 is blocked, with the result that the advance access interlock signal is produced again to permit the extraction of the fifth Byte. This feature is effective at all of the defined boundaries of the Register 16**.

It should be realized that the system of the present invention has wider application than the example described wherein the Data Word lay within two Memory Words and the 8 Bit Bytes were extracted from left to right along the Register 16. The system is capable of extracting any size Data Word, and can be made to work indefinitely or for a given number of cycles. Also, the Byte size may be different than 8 Bits. The size of a Memory Word and the storage capacity of the Register 16 may also be selected as desired. It should also be realized that the principles of the system of the present invention may be applied to right to left operation, or left to right operation, or both, depending upon the particular machine needs.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a data handling system, a register for storing a word of information, said register being divided into two zones by a boundary at the midpoint and the end thereof, means for extracting data from said register in groups of bits less than the size of a word starting at any bit position of said register, and means for loading one of said zones with information when a group of bits being extracted has crossed a boundary into said other zone.

2. In a data handling system, a register in which a word of information is stored, said register being divided into a plurality of zones and having a boundary established between zones, means for extracting information from said register in groups of bits starting at any bit position of said register, means for sensing if the extracted group of bits has crossed a boundary into another zone thereby indicating that the zone from which the information was extracted is empty of information, and means for supplying additional information to the zone of said register from which the information was previously extracted.

3. In a data handling system, a register for storing a word of information, said register being divided into a plurality of zones, means for extracting a predetermined amount of data from said register starting at any bit position thereof in fixed size groups of bits of less than the size of the word stored in the register, means for supplying information to one of said zones while information is being extracted from another one of said zones and means for masking out selected bits of an extracted group of bits.

4. In a data handling system, a register in which a word of information is stored, said register being divided into a plurality of zones and having a boundary established between zones, means for extracting a predetermined amount of data from said register starting at any bit position thereof in fixed size groups of bits less than the size of a word, means for sensing if the extracted group of bits has crossed the boundary into another zone, means responsive to said sensing means for supplying information to the zone of said register from which the information was previously extracted, and means for masking out selected bits of an extracted group of bits.

5. In a data handling system having a memory for storing a plurality of words of information, the combination comprising a register in which a word of information is stored, said register being divided into a plurality of zones and having a boundary between zones, a plurality of gating means connecting respective zones of said register to said memory, means for extracting the information from said register in groups of bits starting at any bit position of the register, the number of bits in a zone being greater than the number of bits in an extracted group, means for sensing when an extracted group of bits has crossed a boundary, means responsive to the determination of a boundary cross-over by said sensing means for conditioning one of said gating means to supply additional information from said memory to the zone of said register from which the information was previously extracted.

6. In a data handling system having a memory for storing a plurality of words of information; the combination comprising a register in which a word of information is stored, said register being divided into a plurality of zones and having a boundary between zones, a plurality of gating means connecting respective zones of said register to said memory, means for extracting a predetermined amount of information from said register in groups of fixed size bits starting at any bit position of the register, the number of bits in a zone being greater than the number of bits in an extracted group, means for sensing when an extracted group of bits has crossed a boundary, means responsive to the determination of a boundary cross-over by said sensing means for conditioning one of said gating means to supply additional information from said memory to the zone of said register from which the information was previously extracted, and means for masking out selected bits of an extracted group of bits.

7. In a data handling system having a memory for storing a plurality of words of information, means for extracting a data word containing a predetermined number of bits of information from said memory in groups of bits beginning at any bit address of a word comprising, a first register for storing one of said words of information, said first register being divided into two zones with a boundary at the midpoint and end thereof, a second register for determining the count as to the number of bits of the data word yet to be extracted, first addressing means for locating the starting bit address position of a group of bits to be extracted, means for combining the count of said second register and the bit address of said first addressing means to determine whether a boundary has been crossed-over during the extraction of a group of bits, and means responsive to the determination of a boundary cross-over to load information from said memory into the zone of said register from which no extraction is taking place.

8. In a data handling system having a memory for storing a plurality of words of information, the combination comprising means for extracting a data word containing a predetermined number of bits of information from said memory in fixed size groups of bits beginning at any bit address of a word comprising, a first register for storing one of said words of information, said first register being divided into a plurality of zones with a boundary between zones, a second register for determining the count as to the number of bits of the data word yet to be extracted, first addressing means for locating the starting bit address position of a group of bits to be extracted, means for combining the count of said second register and the bit address of said first addressing means to determine whether a boundary has been crossed-over during the extraction of a group of bits, means responsive to the determination of a boundary cross-over to load information from said memory into the zone of said register from which no extraction is taking place, and means responsive to the count in said second register for masking out selected bits of an extracted group of bits.

9. In a data handling system having a memory for storing a plurality of words of information, means for extracting a data word containing a predetermined number of bits of information from said memory in fixed size groups of bits beginning at any bit position of a word comprising a first register for storing one of said words of information, said first register being divided into two zones by a boundary at the midpoint and the end of the first register, a second register for determining the count as to the number of bits of the data word yet to be extracted, first addressing means for locating the starting bit address position of a group of bits to be extracted, means for decrementing the count of said second register and incrementing the starting bit address position of said first addressing means in accordance with the size of the group of bits extracted, means for combining the count of said second register and the bit address of said first addressing means to determine whether a boundary has been crossed-over during the extraction of a group of bits, and means responsive to the determination of a boundary cross-over to load information from said memory into the half of the first register from which no extraction is taking place.

10. In a data handling system having a memory for storing a plurality of words of information, means for extracting a data word containing a predetermined number of bits of information from said memory in fixed size groups of bits beginning at any bit position of a word comprising a first register for storing one of said words of information, said first register being divided into two zones by a boundary at the midpoint and the end of the first register, a second register for determining the count as to the number of bits of the data word yet to be extracted, first addressing means for locating the starting bit address position of a group of bits to be extracted, means for decrementing the count of said second register and incrementing the starting bit address position of said first addressing means in accordance with the size of the group of bits extracted, means for combining the count of said second register and the bit address of said first addressing means to determine whether a boundary has been crossed-over during the extraction of a group of bits, means responsive to the determination of a boundary cross-over to load information from said memory into the half of the first register from which no extraction is taking place and means responsive to the count in said first register and the size of the group of bits to produce a signal terminating the extraction operation when the count in said first register is equal to or less than the fixed size of a group of bits.

11. In a data handling system having a memory for storing a plurality of words of information, means for extracting a data word containing a predetermined number of bits of information from said memory in fixed size groups of bits beginning at any bit position of a word comprising a first register for storing one of said words of information, said first register being divided into two zones by a boundary at the midpoint and the end of the first register, first and second gating means respectively connecting said first register to said memory, a second register for determining the count as to the number of bits of the data word yet to be extratced, first addressing means for locating the starting bit address position of a group of bits to be extracted, means for decrementing the count of said second register and incrementing the starting bit address position of said first addressing means in accordance with the size of the group of bits extracted, means for combining the count of said second register and the bit address of said first addressing means to determine whether a boundary has been crossed-over during the extraction of a group of bits, and means responsive to the determination of a boundary cross-over to condition the proper one of said first and second gating means to transfer information from said memory into the half of the register in which no extraction is taking place.

12. In a data handling system, a memory for storing a plurality of words of information, the midpoint end of each word being designated as a boundary, first addressing means for selecting a predtermined word in said memory, second addressing means for selecting a predetermined bit position in said word, a first register designating the total number of bits to be extracted from said memory, a second register, means responsive to said first addressing means for transferring the total word located in memory at the designated address to said second register, means for incrementing the contents of said first register by one after said word transfer, means for extracting groups of bits of information from said second register beginning at the predetermined bit position of said second addressing means, means for decrementing the contents of said first register in accordance with the size of the group of bits being extracted, means for decrementing the contents of said second addressing means in accordance with the size of the group of bits extracted, means for combining the contents of said first register and said second addressing means to determine if the previously extracted group of bits has crossed a boundary and if so in which half of the second register the next group of bits to be extracted lies, means responsive to the detection of a boundary cross-over to initiate another memory cycle so that the said means responsive to said first addressing means transfers the half of the word located in memory at the next successive address to the half of said second register from which no data is being extracted.

13. In a data handling system, a memory for storing a plurality of words of information, the midpoint and end of each word being designated as a boundary, first addressing means for selecting a predetermined word in said memory, second addressing means for selecting a predetermined bit position in said selected word, a first register designating the number of bits of a word to be successively extracted starting at the selected bit position in the selected word, a second register designating the total number of bits to be extracted from said memory, a third register, maens responsive to said first addressing means for transferring the word located in memory at the designated address to said third register, means for incrementing by one the contents of said first addressing means after said word transfer, first gate means associated with the left half of said third register, second gate means associated with the right half of said third register, a fourth register, a utilization device, means for initially rendering said first and second gate circuit means effective to transfer said first selected word to said fourth register, means for decreasing the contents of said second register in accordance with the contents of said first register, means responsive to said second addressing means and the contents of said first register for causing a group of bits to be transferred to said utilization device, means effective after completion of said transfer for increasing the contents of said second addressing means in accordance with the contents of said first register, means for sensing the contents of said second addressing means and said second register to determine if the previously extracted group of bits has crossed a boundary and if so in which half it lies, means responsive to the detection of a boundary cross-over to initiate another memory cycle so that said means responsive to said first addressing means transfers the word located in memory at the next successive address to said third register, means for controlling the first and second gate circuit means to transfer half of the word in the third register to the half of the fourth register from which no data is being extracted.

References Cited in the file of this patent

UNITED STATES PATENTS

| | | |
|---|---|---|
| 2,844,815 | Winick | July 22, 1958 |
| 2,853,698 | Nettleton | Sept. 23, 1958 |
| 2,866,177 | Steele | Dec. 23, 1958 |
| 2,901,732 | Canning | Aug. 25, 1959 |
| 2,969,522 | Crosby | Jan. 24, 1961 |

OTHER REFERENCES

Publication: Handbook of Automation, Computation and Control, by Grabbe, Ramo and Wooldridge, Vol. II, Chapter 18, Section 5. Pages 18-30 and 18-31.